US012469420B2

(12) United States Patent
Wang et al.

(10) Patent No.: US 12,469,420 B2
(45) Date of Patent: Nov. 11, 2025

(54) IMAGE-QUALITY CALIBRATING METHOD AND SYSTEM AND STORAGE MEDIUM

(71) Applicant: BOE Technology Group Co., Ltd., Beijing (CN)

(72) Inventors: Xian Wang, Beijing (CN); Lihua Geng, Beijing (CN); Ying Zhang, Beijing (CN); Xitong Ma, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/021,859

(22) PCT Filed: Mar. 29, 2022

(86) PCT No.: PCT/CN2022/083813
§ 371 (c)(1),
(2) Date: Feb. 17, 2023

(87) PCT Pub. No.: WO2023/184176
PCT Pub. Date: Oct. 5, 2023

(65) Prior Publication Data
US 2024/0274054 A1 Aug. 15, 2024

(51) Int. Cl.
*G09G 3/20* (2006.01)

(52) U.S. Cl.
CPC ... *G09G 3/2003* (2013.01); *G09G 2320/0626* (2013.01); *G09G 2320/0666* (2013.01); *G09G 2320/0693* (2013.01)

(58) Field of Classification Search
CPC ......... G09G 3/2003; G09G 2320/0626; G09G 2320/0666; G09G 2320/0693
See application file for complete search history.

(56) References Cited

U.S. PATENT DOCUMENTS 4,335,397 A * 6/1982 Tamura .................. H04N 23/88 348/207.99
2016/0284284 A1* 9/2016 Liu ...................... G09G 3/3607
2019/0304352 A1* 10/2019 Cho ....................... G09G 3/006
2022/0398969 A1* 12/2022 Wang ..................... G09G 3/006

* cited by examiner

*Primary Examiner* — Sing-Wai Wu
(74) *Attorney, Agent, or Firm* — WHDA, LLP

(57) ABSTRACT

The present disclosure provides an image-quality calibrating method and system and a storage medium. The method includes: when a display screen is displaying a testing image, measuring the actually measured chromaticity coordinate of a target pixel unit in the image; according to a magnitude relation between the actually measured chromaticity coordinate and a standard chromaticity coordinate, by adjusting the pixel component of the target pixel unit, performing coarse adjustment to coordinate values of the actually measured chromaticity coordinate in a first direction and a second direction, and repeatedly performing the coarse adjustment till both of differences in the first direction and the second direction between the actually measured chromaticity coordinate obtained after the coarse adjustment and the standard chromaticity coordinate are less than a first preset value.

19 Claims, 8 Drawing Sheets

IMAGE-QUALITY CALIBRATING METHOD AND SYSTEM AND STORAGE MEDIUM

TECHNICAL FIELD

The present disclosure relates to the technical field of displaying and, more particularly, to an image-quality calibrating method and system and a storage medium.

BACKGROUND

The light-source spectrum is an important factor that influences the image quality of a display screen. The quality of the light-source spectrum may be evaluated by using many indicators, for example, the color temperature and the peak brightness.

Some professional displaying devices, for example, professional monitors, have very high requirements on the image quality; for example, they should support displaying of various color temperatures and various gamma brightness modes. However, different batches of the professional displaying devices, as limited by the optical module, cannot totally reach the requirements on the required high image quality. Therefore, the image quality of the displaying devices is required to be calibrated, to satisfy the requirements on the high image quality required by the professional devices.

SUMMARY

The present disclosure provides an image-quality calibrating method, wherein the method includes:

when a to-be-tested display screen is displaying a testing image, measuring a chromaticity of a target pixel unit in the testing image, to obtain an actually measured chromaticity coordinate of the target pixel unit;

according to a magnitude relation between the actually measured chromaticity coordinate and a standard chromaticity coordinate, by adjusting a pixel component of at least one color channel of the target pixel unit, performing coarse adjustment to coordinate values of the actually measured chromaticity coordinate in a first direction and a second direction, and repeatedly performing the coarse adjustment till both of differences in the first direction and the second direction between the actually measured chromaticity coordinate obtained after the coarse adjustment and the standard chromaticity coordinate are less than a first preset value, wherein both of the first direction and the second direction are a chromaticity-coordinate direction; and according to a magnitude relation between the actually measured chromaticity coordinate obtained after the coarse adjustment and the standard chromaticity coordinate and a magnitude relation between the differences, by adjusting the pixel component of at least one color channel of the target pixel unit, performing fine adjustment to coordinate values of the actually measured chromaticity coordinate obtained after the coarse adjustment in the first direction and the second direction at a same time, whereby both of differences in the first direction and the second direction between the actually measured chromaticity coordinate obtained after the fine adjustment and the standard chromaticity coordinate are less than a second preset value, to complete color-temperature calibration of the display screen, wherein the second preset value is less than the first preset value.

Optionally, before the step of measuring the chromaticity of the target pixel unit in the testing image, the method further includes:

when a light-source electric signal of the to-be-tested display screen is preset to be a preset duty cycle, causing the to-be-tested display screen to display the testing image;

measuring a peak brightness of the display screen; and when the peak brightness is greater than a first preset brightness, by adjusting downwards a duty cycle of the light-source electric signal, performing preliminary adjustment to the peak brightness, whereby the peak brightness obtained after the preliminary adjustment is less than or equal to the first preset brightness; and after the step of, according to the magnitude relation between the actually measured chromaticity coordinate obtained after the coarse adjustment and the standard chromaticity coordinate and the magnitude relation between the differences, by adjusting the pixel component of the at least one color channel of the target pixel unit, performing the fine adjustment to the coordinate values of the actually measured chromaticity coordinate obtained after the coarse adjustment in the first direction and the second direction at a same time, the method further includes:

measuring the peak brightness of the display screen again; and when the peak brightness that has been measured again is greater than or equal to a second preset brightness and less than or equal to a third preset brightness, completing peak-brightness calibration of the display screen, wherein the second preset brightness is less than the third preset brightness, and the third preset brightness is less than the first preset brightness.

Optionally, after the step of measuring the peak brightness of the display screen again, the method further includes:

when the peak brightness that has been measured again is greater than a fourth preset brightness and less than the second preset brightness, by adjusting upwards the duty cycle of the light-source electric signal, performing precise adjustment to the peak brightness, till the peak brightness obtained after the precise adjustment is greater than or equal to the second preset brightness, and less than or equal to the third preset brightness, wherein the fourth preset brightness is less than the second preset brightness; and after the step of measuring the peak brightness of the display screen again, the method further includes:

when the peak brightness that has been measured again is greater than the third preset brightness, by adjusting downwards the duty cycle of the light-source electric signal, performing precise adjustment to the peak brightness, till the peak brightness obtained after the precise adjustment is greater than or equal to the second preset brightness, and less than or equal to the third preset brightness.

Optionally, after the step of performing the precise adjustment to the peak brightness, till the peak brightness obtained after the precise adjustment is greater than or equal to the second preset brightness, and less than or equal to the third preset brightness, the method further includes:

when the peak brightness obtained after the precise adjustment is greater than or equal to the second preset brightness and less than or equal to the third preset brightness, calibrating a color temperature of the display screen again, till it is satisfied that both of the differences in the first direction and the second direction between the actually measured chromaticity coordinate obtained after the fine adjustment and the standard chromaticity coordinate are less than the second preset value;

further measuring the peak brightness of the display screen; and when the peak brightness that has been further measured is greater than or equal to the second preset brightness and less than or equal to the third preset brightness, completing the color-temperature calibration and the peak-brightness calibration.

Optionally, the target pixel unit includes three color channels;

before the step of, according to the magnitude relation between the actually measured chromaticity coordinate and the standard chromaticity coordinate, by adjusting the pixel component of the at least one color channel of the target pixel unit, performing the coarse adjustment to the coordinate values of the actually measured chromaticity coordinate in the first direction and the second direction, and repeatedly performing the coarse adjustment till both of the differences in the first direction and the second direction between the actually measured chromaticity coordinate obtained after the coarse adjustment and the standard chromaticity coordinate are less than the first preset value, the method further includes:

according to the magnitude relation between the actually measured chromaticity coordinate and the standard chromaticity coordinate, determining a processing mode to the target pixel unit; and determining a maintained color channel whose pixel component maintains constant in the processing mode, wherein the other two color channels than the maintained color channel among the three color channels serve as candidate color channels whose pixel values are regulatable in the processing mode; and the step of, according to the magnitude relation between the actually measured chromaticity coordinate and the standard chromaticity coordinate, by adjusting the pixel component of the at least one color channel of the target pixel unit, performing the coarse adjustment to the coordinate values of the actually measured chromaticity coordinate in the first direction and the second direction, and repeatedly performing the coarse adjustment till both of the differences in the first direction and the second direction between the actually measured chromaticity coordinate obtained after the coarse adjustment and the standard chromaticity coordinate are less than the first preset value includes:

according to the magnitude relation between the actually measured chromaticity coordinate and the standard chromaticity coordinate, by adjusting a pixel component of at least one of the candidate color channels of the target pixel unit, performing coarse adjustment to the coordinate values of the actually measured chromaticity coordinate in the first direction and the second direction, and repeatedly performing the coarse adjustment till both of the differences in the first direction and the second direction between the actually measured chromaticity coordinate obtained after the coarse adjustment and the standard chromaticity coordinate are less than the first preset value.

Optionally, the actually measured chromaticity coordinate includes a first-direction actually measured coordinate and a second-direction actually measured coordinate, and the standard chromaticity coordinate includes a first-direction standard coordinate and a second-direction standard coordinate; and the step of, according to the magnitude relation between the actually measured chromaticity coordinate obtained after the coarse adjustment and the standard chromaticity coordinate and the magnitude relation between the differences, by adjusting the pixel component of the at least one color channel of the target pixel unit, performing the fine adjustment to the coordinate values of the actually measured chromaticity coordinate obtained after the coarse adjustment in the first direction and the second direction at a same time includes:

according to the magnitude relation between the actually measured chromaticity coordinate obtained after the coarse adjustment and the standard chromaticity coordinate, performing fine adjustment of a first stage;

circularly executing the first stage, till a preset condition is satisfied or a preset execution time quantity is reached, wherein the preset condition includes that both of difference between the first-direction actually measured coordinate obtained after the fine adjustment and the first-direction standard coordinate and difference between the second-direction actually measured coordinate obtained after the fine adjustment and the second-direction standard coordinate are less than the second preset value; and when an execution time quantity of the first stage reaches the preset execution time quantity and still does not satisfy the preset condition, according to a magnitude relation between the actually measured chromaticity coordinate obtained after the fine adjustment at the first stage and the standard chromaticity coordinate, and a current magnitude relation between a first difference and a second difference, performing fine adjustment of a second stage, till the preset condition is satisfied, wherein the first difference is a current difference between the first-direction actually measured coordinate and the first-direction standard coordinate, and the second difference is a current difference between the second-direction actually measured coordinate and the second-direction standard coordinate.

Optionally, the step of, according to the magnitude relation between the actually measured chromaticity coordinate obtained after the coarse adjustment and the standard chromaticity coordinate, performing the fine adjustment of the first stage includes:

according to a magnitude relation between the first-direction actually measured coordinate obtained after the coarse adjustment and the first-direction standard coordinate, and a magnitude relation between the second-direction actually measured coordinate obtained after the coarse adjustment and the second-direction standard coordinate, determining a fifth to-be-adjusted color channel in the processing mode, and a fifth adjustment trend of a pixel component of the fifth to-be-adjusted color channel; and according to the fifth adjustment trend, adjusting the pixel component of the fifth to-be-adjusted color channel of the target pixel unit, to perform fine adjustment to the first-direction actually measured coordinate and the second-direction actually measured coordinate at a same time.

Optionally, the step of, according to the magnitude relation between the actually measured chromaticity coordinate obtained after the coarse adjustment and the standard chromaticity coordinate, and the magnitude relation between the first difference and the second difference, performing the fine adjustment of the second stage includes:

according to a magnitude relation between the first difference and the second difference, determining a sixth to-be-adjusted color channel in the processing mode;

according to a magnitude relation between the first-direction actually measured coordinate obtained after the coarse adjustment and the first-direction standard coordinate, and a magnitude relation between the second-direction actually measured coordinate obtained after the coarse adjustment and the second-direction standard coordinate, determining a sixth adjustment trend of a pixel component of the sixth to-be-adjusted color channel; and according to the sixth adjustment trend, adjusting the pixel component of the sixth to-be-adjusted color channel of the target pixel unit, to perform fine adjustment to the first-direction actually measured coordinate and the second-direction actually measured coordinate at a same time.

Optionally, the step of, according to the magnitude relation between the first difference and the second difference, determining the sixth to-be-adjusted color channel in the processing mode includes:

when the first difference is greater than or equal to the second difference, determining the sixth to-be-adjusted color channel in the processing mode to be a candidate color channel that has a largest influence on the first direction in the processing mode; and when the first difference is less than the second difference, determining the sixth to-be-adjusted color channel in the processing mode to be a candidate color channel that has a largest influence on the second direction in the processing mode.

Optionally, the actually measured chromaticity coordinate includes a first-direction actually measured coordinate and a second-direction actually measured coordinate, and the standard chromaticity coordinate includes a first-direction standard coordinate and a second-direction standard coordinate; and the step of, according to the magnitude relation between the actually measured chromaticity coordinate and the standard chromaticity coordinate, by adjusting the pixel component of the at least one of the candidate color channels of the target pixel unit, performing the coarse adjustment to the coordinate values of the actually measured chromaticity coordinate in the first direction and the second direction, and repeatedly performing the coarse adjustment till both of the differences in the first direction and the second direction between the actually measured chromaticity coordinate obtained after the coarse adjustment and the standard chromaticity coordinate are less than the first preset value includes:

from the candidate color channels, determining a first to-be-adjusted color channel with respect to the first direction in the processing mode;

according to a magnitude relation between the first-direction actually measured coordinate and the first-direction standard coordinate, determining a first adjustment trend of a pixel component of the first to-be-adjusted color channel; and according to the first adjustment trend, adjusting the pixel component of the first to-be-adjusted color channel of the target pixel unit, to perform a first time of coarse adjustment to the first-direction actually measured coordinate, and cause a difference between the first-direction actually measured coordinate obtained after the coarse adjustment for the first time and the first-direction standard coordinate to be less than a third preset value.

Optionally, after the step of, according to the first adjustment trend, adjusting the pixel component of the first to-be-adjusted color channel of the target pixel unit, to perform the first time of the coarse adjustment to the first-direction actually measured coordinate, and cause the difference between the first-direction actually measured coordinate obtained after the coarse adjustment for the first time and the first-direction standard coordinate to be less than the third preset value, the method further includes:

from the candidate color channels, determining a second to-be-adjusted color channel with respect to the second direction in the processing mode;

according to a magnitude relation between the second-direction actually measured coordinate and the second-direction standard coordinate, determining a second adjustment trend of a pixel component of the second to-be-adjusted color channel; and according to the second adjustment trend, adjusting the pixel component of the second to-be-adjusted color channel of the target pixel unit, to perform a second time of coarse adjustment to the second-direction actually measured coordinate, and cause a difference between the second-direction actually measured coordinate obtained after the coarse adjustment for the first time and the second-direction standard coordinate to be less than the third preset value.

Optionally, after the step of, according to the second adjustment trend, adjusting the pixel component of the second to-be-adjusted color channel of the target pixel unit, to perform the second time of the coarse adjustment to the second-direction actually measured coordinate, and cause the difference between the second-direction actually measured coordinate obtained after the coarse adjustment for the first time and the second-direction standard coordinate to be less than the third preset value, the method further includes:

from the candidate color channels, determining a third to-be-adjusted color channel with respect to the first direction in the processing mode;

according to the magnitude relation between the first-direction actually measured coordinate and the first-direction standard coordinate, determining a third adjustment trend of a pixel component of the third to-be-adjusted color channel; and according to the third adjustment trend, adjusting the pixel component of the third to-be-adjusted color channel of the target pixel unit, to perform a second time of coarse adjustment to the first-direction actually measured coordinate, and cause a difference between the first-direction actually measured coordinate obtained after the coarse adjustment for the second time and the first-direction standard coordinate to be less than the first preset value.

Optionally, after the step of, according to the third adjustment trend, adjusting the pixel component of the third to-be-adjusted color channel of the target pixel unit, to perform the second time of the coarse adjustment to the first-direction actually measured coordinate, and cause the difference between the first-direction actually measured coordinate obtained after the coarse adjustment for the second time and the first-direction standard coordinate to be less than the first preset value, the method further includes:

from the candidate color channels, determining a fourth to-be-adjusted color channel with respect to the second direction in the processing mode;

according to the magnitude relation between the second-direction actually measured coordinate and the second-direction standard coordinate, determining a fourth adjustment trend of a pixel component of the fourth to-be-adjusted color channel; and according to the fourth adjustment trend, adjusting the pixel component of the fourth to-be-adjusted color channel of the target pixel unit, to perform the second time of coarse adjustment to the second-direction actually measured coordinate, and cause a difference between the second-direction actually measured coordinate obtained after the coarse adjustment for the second time and the second-direction standard coordinate to be less than the first preset value.

Optionally, a maximum pixel value that is reachable by the maintaining of the display screen by the pixel component of the maintained color channel before and after the color-temperature calibration is constant.

The present disclosure further provides an image-quality calibrating system, wherein the image-quality calibrating system includes: a displaying terminal and a colorimeter;

the displaying terminal includes a display screen, a memory and one or more processors;

the display screen is configured for displaying the testing image;

the colorimeter is configured for measuring the chromaticity of the target pixel unit in the testing image, to obtain the actually measured chromaticity coordinate of the target pixel unit, and transmitting the obtained actually measured chromaticity coordinate to the one or more processors; and the memory stores one or more programs, and the programs, when executed by the one or more processors, implement the steps of the color-temperature calibration in the image-quality calibrating method stated above.

Optionally, the displaying terminal further includes a system on chip;

the memory is integrated in the system on chip;

the one or more processors include: a field-programmable logic gate array, and at least one processor integrated in the system on chip;

the at least one processor is coupled to the colorimeter and the field-programmable logic gate array, and the at least one processor is configured for receiving the actually measured chromaticity coordinate of the target pixel unit transmitted by the colorimeter, according to the actually measured chromaticity coordinate, determining an adjustment amount of a pixel component of at least one color channel of the target pixel unit, and transmitting the pixel component obtained after the adjustment of the target pixel unit to the field-programmable logic gate array; and the field-programmable logic gate array is coupled to the display screen, and is configured for, according to the pixel component obtained after the adjustment of the target pixel unit, driving the display screen to display.

Optionally, the system further includes a brightness meter;

the display screen is further configured for, when a light-source electric signal is preset to be a preset duty cycle, displaying the testing image;

the brightness meter is configured for measuring a peak brightness of the display screen, and transmitting the measured peak brightness to the at least one processor; and the at least one processor is coupled to the brightness meter, and the programs, when executed by the one or more processors, implement the steps of the peak-brightness calibration in the image-quality calibrating method stated above.

Optionally, the at least one processor is further configured for, before the color-temperature calibration, receiving the peak brightness transmitted by the brightness meter, according to the peak brightness, determining a duty-cycle preliminary adjustment amount of the light-source electric signal, and transmitting the duty-cycle preliminary adjustment amount to the field-programmable logic gate array; and the field-programmable logic gate array is further configured for, according to the duty-cycle preliminary adjustment amount, performing preliminary adjustment to the duty cycle of the light-source electric signal of the display screen, and according to the duty cycle of the light-source electric signal obtained after the preliminary adjustment, driving the display screen to display.

Optionally, the at least one processor is further configured for, after the color-temperature calibration, receiving the peak brightness measured again that is transmitted by the brightness meter, according to the peak brightness measured again, determining a duty-cycle fine adjustment amount of the light-source electric signal, and transmitting the duty-cycle fine adjustment amount to the field-programmable logic gate array; and the field-programmable logic gate array is further configured for, according to the duty-cycle fine adjustment amount, performing precise adjustment to the duty cycle of the light-source electric signal of the display screen, and according to the duty cycle of the light-source electric signal obtained after the precise adjustment, driving the display screen to display.

The present disclosure further provides a non-transitory computer-readable storage medium, wherein the storage medium stores a computer program instruction, and the computer program instruction, when executed in the image-quality calibrating system stated above, causes the image-quality calibrating system to implement one or more of the steps of the image-quality calibrating method stated above.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are embodiments of the present disclosure, and a person skilled in the art can obtain other figures according to these figures without paying creative work.

DETAILED DESCRIPTION

Figure 1:
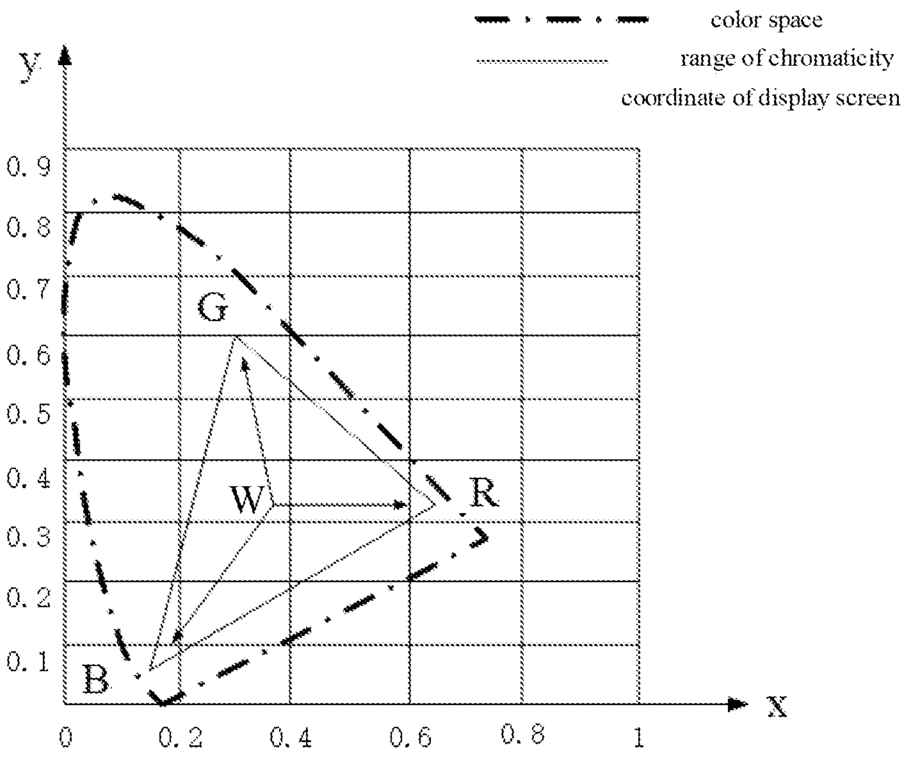
FIG. 1 shows a schematic diagram of the chromaticity coordinate according to an embodiment of the present disclosure.

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Unless stated otherwise in the context, throughout the description and the claims, the term “comprise” and other forms thereof, for example, the singular from in third personal “comprises” and the present participle “comprising”, are interpreted as the meaning of opened containing, i.e., “including but not limited to”. In the description of the present disclosure, the terms “one embodiment”, “some embodiments”, “exemplary embodiments”, “example”, “specific example” or “some examples” are intended to indicate that specific features, structures, materials or characteristics related to the embodiment or example are comprised in at least one embodiment or example of the present disclosure. The illustrative indication of the above terms does not necessarily refer to the same one embodiment or example. Moreover, the specific features, structures, materials or characteristics may be comprised in any one or more embodiments or examples in any suitable manner.

In the following, the terms “first” and “second” are merely for the purpose of describing, and should not be construed as indicating or implying the degrees of importance or implicitly indicating the quantity of the specified technical features. Accordingly, the features defined by “first” and “second” may explicitly or implicitly comprise one or more of the features. In the description of the embodiments of the present disclosure, unless stated otherwise, the meaning of “plurality of” is “two or more”.

In the description on some embodiments, “couple” and “connect” and the derivatives thereof may be used. For example, in the description on some embodiments, the term “connect” may be used to indicate that two or more components directly physically contact or electrically contact. As another example, in the description on some embodiments, the term “couple” may be used to indicate that two or more components directly physically contact or electrically contact. However, the term “couple” or “communicatively coupled” may also indicate that two or more components do not directly contact, but still cooperate with each other or act on each other. The embodiments disclosed herein are not necessarily limited by the contents herein.

“At least one of A, b and C” and “at least one of A, b or C” have the same meaning, and both of them include the following combinations of A, b and C: solely A, solely B, solely C, the combination of A and B, the combination of A and C, the combination of B and C, and the combination of A, b and C.

“A and/or B” include the following three combinations: solely A, solely B, and the combination of A and B.

As used herein, with reference to the context, the term “if” is optionally interpreted as meaning “when” or “in response to determining that” or “in response to detecting that”. Similarly, with reference to the context, the phrase “if it is determined that” or “if the stated condition or event has been detected” is optionally interpreted as referring to “when it is determined that” or “in response to determining . . . ” or “when the stated condition or event has been detected” or “in response to the stated condition or event having been detected”.

As used herein, with reference to the context, the term “difference” is merely intended to describe “the absolute value of the difference”, and should not be comprehended as indicating or implying that there is a positive-negative direction relation.

The “adapted for” or “configured for” as used herein is intended as opened and inclusive languages, and does not exclude apparatuses adapted for or configured for executing additional tasks or steps.

In addition, the “based on” as used is intended as opened and inclusive, because a process, step, calculation or other action “based on” one or more described conditions or values may, in practice, be based on an additional condition or exceed the described values.

The standard color temperature of display screens is usually 6500K (i.e., D65), and other commonly used color temperatures include 9300K, 5500K, 5000K and so on. The image-quality calibration of display screens usually uses 6500K as the standard.

The color temperature of a display screen may be expressed as the chromaticity coordinate of the white-color image displayed by the display screen. The chromaticity coordinates of the pixels of a white-color image at different color temperatures are shown in Table 1.

TABLE 1

| chromaticity coordinate | 9300 K | 6500 K | 5500 K | 5000 K | 4800 K | 4400 K | 4000 K | 3600 K | 3200 K |
|---|---|---|---|---|---|---|---|---|---|
| x | 0.283 | 0.3127 | 0.3324 | 0.3451 | 0.351 | 0.3644 | 0.3804 | 0.3998 | 0.4234 |
| y | 0.297 | 0.329 | 0.3474 | 0.3516 | 0.3562 | 0.3661 | 0.3768 | 0.3879 | 0.399 |
| z | 0.42 | 0.3583 | 0.3202 | 0.3033 | 0.2928 | 0.2695 | 0.2428 | 0.2123 | 0.1776 |

The chromaticity coordinate (x,y,z) includes a first-direction coordinate x, a second-direction coordinate y and a third-direction coordinate z. Because the sum of the first-direction coordinate x, the second-direction coordinate y and the third-direction coordinate z is 1, i.e., x+y+z=1, when the numerical values of the first-direction coordinate x and the second-direction coordinate y have been determined, the chromaticity coordinate (x,y,z) is uniquely determined, and the corresponding color temperature is uniquely determined.

The color-temperature calibration is actually performed with respect to the white-point pixel units, i.e., the pixel components of the white-point pixel units R=G=B. In a displaying system of a bit depth of 10 bits (if the bit depth is higher, the displaying system can present more grayscale degrees), there are $2^{10}$ ($2^{10}$=1024) grayscale degrees, and correspondingly, the range of the pixel values of the three sub-pixels R, G and B (in the present disclosure, the pixel value of a sub-pixel is referred to as a pixel component) is 0-1023. In a standard displaying device, the color temperature does not vary with time or with the changing of the pixel value. However, in practical displaying devices, generally the color temperature varies with the changing of the pixel value, especially at a low grayscale, i.e., when the pixel value is low. Therefore, usually, at a low grayscale, the color temperatures of the pixels whose displaying brightness is less than 10 nits are not taken into consideration and calibrated. Assuming that at over 10 nits the color temperature tends to be stable, then it may be allowed to calibrate merely the color temperatures of the largest pixels, i.e., R=G=B=1023.

At the initial moment, all of the pixel components of the three color channels RGB are 1023, at which point the chromaticity coordinate is the original chromaticity coordinate of the display screen, and, in practice, is the chromaticity coordinates x and y that are measured by using a colorimeter when R=G=B=1023. By adjustment, the difference between the actually measured chromaticity coordinate xy and the standard chromaticity coordinate xy is increasingly lower, which is the purpose of the color-temperature calibration.

The color-temperature calibration can, by changing the RGB pixel values inputted into the pixel units, change the displayed chromaticity coordinates x and y. FIG. 1 illustratively shows the area of the chromaticity coordinate that is covered in a color space by a display screen. Referring to FIG. 1, in an RGB colour-gamut triangle, if the pixel component of a certain color channel is increased, the chromaticity coordinate of a white point W moves from the center toward the vertex angle of the color channel. For example, if the R pixel component is increased, the value of the chromaticity coordinate x of a white point W is increased, and the value of the chromaticity coordinate y is reduced. In contrast, if the pixel component of a certain color channel is reduced, the chromaticity coordinate of a white point W moves from the vertex angle of the color channel toward the center. The corresponding relation between the chromaticity coordinate of a white point W and the pixel values of the color channels is as follows:

TABLE 2

| white point W | x | y | white point W | x | y |
|---|---|---|---|---|---|
| R− | ↓ | ↑ | R+ | ↑ | ↓ |
| G− | ↑ | ↓ | G+ | ↓ | ↑ |
| B− | ↑ | ↑ | B+ | ↓ | ↓ |

Referring to FIG. 1 and Table 2, if the pixel component of the first color channel R in the target pixel unit is reduced (R−), then the first-direction coordinate x is reduced (↓), and the second-direction coordinate y is increased (↑). If the pixel component of the first color channel R in the target pixel unit is increased (R+), then the first-direction coordinate x is increased (↑), and the second-direction coordinate y is reduced (↓).

If the pixel component of the second color channel G in the target pixel unit is reduced (G−), then the first-direction coordinate x is increased (↑), and the second-direction coordinate y is reduced (↓). If the pixel component of the second color channel G in the target pixel unit is increased (G+), then the first-direction coordinate x is reduced (↓), and the second-direction coordinate y is increased (↑).

If the pixel component of the third color channel B in the target pixel unit is reduced (B−), then the first-direction coordinate x is increased (↑), and the second-direction coordinate y is increased (↑). If the pixel component of the third color channel B in the target pixel unit is increased (B+), then the first-direction coordinate x is reduced (↓), and the second-direction coordinate y is reduced (↓).

Figure 2:
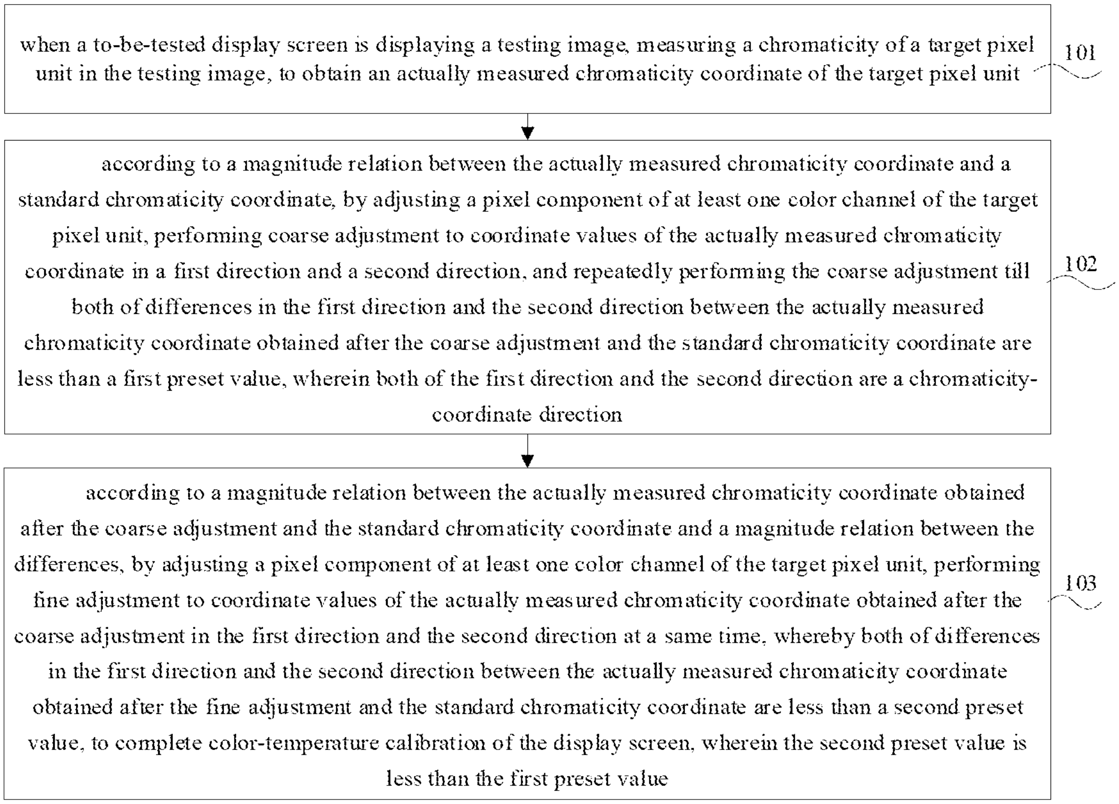
FIG. 2 shows a flow chart of the steps of an image-quality calibrating method according to an embodiment of the present disclosure.

In view of that, an embodiment of the present disclosure provides an image-quality calibrating method. FIG. 2 shows a flow chart of the steps of the image-quality calibrating method. The method is at least used to calibrate the color temperature of a display screen. Referring to FIG. 2, the method includes the following steps:

Step 101: when a to-be-tested display screen is displaying a testing image, measuring a chromaticity of a target pixel unit in the testing image, to obtain an actually measured chromaticity coordinate of the target pixel unit.

The color-temperature calibration uses a target color temperature as the reference, and adjusts the actual color temperature of the display screen to be the target color temperature. The target color temperature refers to the standard color temperature that the to-be tested display screen should reach, for example, 6500K. However, because of factors such as the process and the batch, the actual color temperature cannot reach the ideal standard color temperature. Firstly, the to-be tested display screen may be controlled to display a testing image, and when the testing image is being displayed, chromaticity measurement may be performed to the target pixel unit in the testing image displayed by the display screen, to obtain the actually measured chromaticity coordinate ($x_1$,$y_1$) of the target pixel unit, wherein $x_1$ is the first-direction actually measured coordinate, and $y_1$ is the second-direction actually measured coordinate.

Optionally, the testing image may be a white-color image.

Step 102: according to a magnitude relation between the actually measured chromaticity coordinate and a standard chromaticity coordinate, by adjusting a pixel component of at least one color channel of the target pixel unit, performing coarse adjustment to coordinate values of the actually measured chromaticity coordinate in a first direction and a second direction, and repeatedly performing the coarse adjustment till both of differences in the first direction and the second direction between the actually measured chromaticity coordinate obtained after the coarse adjustment and the standard chromaticity coordinate are less than a first preset value, wherein both of the first direction and the second direction are a chromaticity-coordinate direction.

The standard chromaticity coordinate refers to the chromaticity coordinate of the target pixel unit at the target color temperature in an ideal state. The standard chromaticity coordinate of the target pixel unit at the target color temperature may refer to Table 1.

In this step, the process may include, according to the magnitude relation between the actually measured chromaticity coordinate and the standard chromaticity coordinate, determining the color channel required to be adjusted in the target pixel unit, and the adjustment trend of the pixel component of the color channel, i.e., whether it is required to increase the pixel component of the color channel or reduce the pixel component of the color channel, and subsequently performing coarse adjustment to the actually measured chromaticity coordinate of the target pixel unit.

The principle of adjustment that is required to be followed with respect to the color channel required to be adjusted and the adjustment trend of the pixel component of the color channel is to cause the actually measured chromaticity coordinate to be closer to the standard chromaticity coordinate.

When the different chromaticity-coordinate directions are calibrated, the color channels required to be adjusted might be different. In the calibration in the first direction, the color channel required to be adjusted is the color channel that has a larger influence on the first-direction chromaticity coordinate, and in the calibration in the second direction, the color channel required to be adjusted is the color channel that has a larger influence on the second-direction chromaticity coordinate.

Particularly, the process may include, based on the principle of causing the first-direction actually measured coordinate $x_1$ to be closer to the first-direction standard coordinate $x_0$, calibrating in the first direction, and by adjusting the pixel component of at least one color channel that has a larger influence on the first-direction chromaticity coordinate, performing coarse adjustment to the coordinate value in the first direction of the actually measured chromaticity coordinate (i.e., the first-direction actually measured coordinate $x_1$). The process may include, based on the principle of causing the second-direction actually measured coordinate $y_1$ to be closer to the second-direction standard coordinate $y_0$, calibrating in the second direction, and by adjusting the pixel component of at least one color channel that has a larger influence on the second-direction chromaticity coordinate, performing coarse adjustment to the coordinate value in the second direction of the actually measured chromaticity coordinate (i.e., the second-direction actually measured coordinate $y_1$). The above process may be performed by referring to the rule shown in Table 2.

The alternate coarse adjustments to the first-direction actually measured coordinate and the second-direction actually measured coordinate serve as one round of coarse adjustment. At least two rounds of the coarse adjustment are performed, till both of the difference $\Delta x$ between the first-direction actually measured coordinate and the first-direction standard coordinate and the difference $\Delta y$ between the second-direction actually measured coordinate and the second-direction standard coordinate have been preliminarily converged within the first preset value.

Step 103: according to a magnitude relation between the actually measured chromaticity coordinate obtained after the coarse adjustment and the standard chromaticity coordinate and a magnitude relation between the differences, by adjusting the pixel component of at least one color channel of the target pixel unit, performing fine adjustment to coordinate values of the actually measured chromaticity coordinate obtained after the coarse adjustment in the first direction and the second direction at a same time, whereby both of differences in the first direction and the second direction between the actually measured chromaticity coordinate obtained after the fine adjustment and the standard chromaticity coordinate are less than a second preset value, to complete color-temperature calibration of the display screen, wherein the second preset value is less than the first preset value.

That both of $\Delta x$ and $\Delta y$ are less than the first preset value indicates that the actually measured chromaticity coordinate obtained after the coarse adjustment has already been closer to the standard chromaticity coordinate, and therefore fine adjustment can start to be performed, to further converge $\Delta x$ and $\Delta y$ to be within the lower second preset value, whereby the actually measured chromaticity coordinate and the standard chromaticity coordinate are hardly different.

In this step, the fine adjustment process includes, by referring to the magnitude relation between the actually measured chromaticity coordinate obtained after the coarse adjustment and the standard chromaticity coordinate, and the magnitude relation between $\Delta x$ and $\Delta y$ obtained after the coarse adjustment, performing comprehensive adjustments to the first-direction actually measured coordinate and the second-direction actually measured coordinate at a same time, to cause $\Delta x$ and $\Delta y$ to be quickly converged within a smaller range, to reach the purpose of very close actually measured chromaticity coordinate and standard chromaticity coordinate.

In the fine adjustment, it is required to take into consideration the magnitude relation between $\Delta x$ and $\Delta y$. The magnitude relation between $\Delta x$ and $\Delta y$ can reflect the chromaticity-coordinate direction in which the difference between the actually measured chromaticity coordinate and the standard chromaticity coordinate is higher, and by preferentially adjusting the chromaticity-coordinate direction with the higher difference, $\Delta x$ and $\Delta y$ can be quickly converged within the second preset value. After the fine adjustment, $\Delta x$ and $\Delta y$ are converged within the second preset value; in other words, the color-temperature calibration of the display screen is completed. The color temperature displayed by the display screen can be very close to the standard color temperature in an ideal state (i.e., the target color temperature).

In the embodiments of the present disclosure, this step may includes causing the to-be-tested display screen to display the testing image, and measuring the actually measured chromaticity coordinate of the target pixel unit in the testing image; subsequently, according to the magnitude relation between the actually measured chromaticity coordinate and the standard chromaticity coordinate, by adjusting the pixel component of at least one color channel of the target pixel unit, performing the coarse adjustment to the coordinate values of the actually measured chromaticity coordinate in the first direction and the second direction, and repeatedly performing the coarse adjustment to cause $\Delta x$ and $\Delta y$ to be preliminarily converged within the first preset value; and subsequently, by referring to the magnitude relation between the actually measured chromaticity coordinate and the standard chromaticity coordinate and the magnitude relation between $\Delta x$ and $\Delta y$, by adjusting the pixel component of at least one color channel of the target pixel unit, performing the fine adjustment to the coordinate values of the actually measured chromaticity coordinate obtained after the coarse adjustment in the first direction and the second direction at a same time, to, by the fine adjustment, cause $\Delta x$ and $\Delta y$ to be quickly converged within the second preset value. Accordingly, the actually measured chromaticity coordinate and the standard chromaticity coordinate can be close, thereby completing the color-temperature calibration, whereby the color temperature actually displayed by the display screen is close to the standard target color temperature, which improves the image quality of the display screen.

Figure 3:
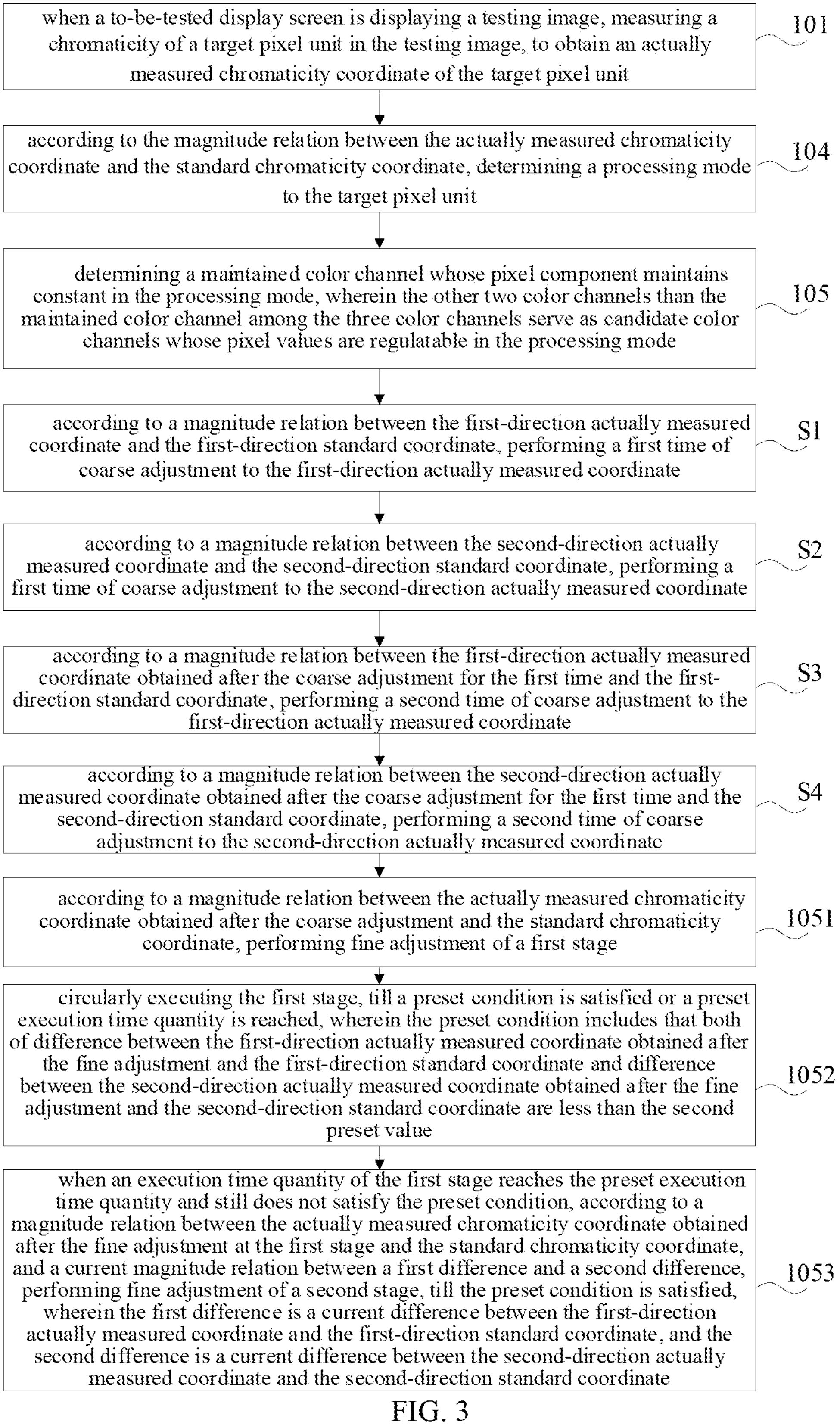
FIG. 3 shows a flow chart of the steps of another image-quality calibrating method according to an embodiment of the present disclosure.

Optionally, referring to FIG. 3, in some embodiments, the target pixel unit may include three color channels, for example, three color channels RGB. Correspondingly, before the step 102, the image-quality calibrating method may further include the following steps:

Step 104: according to the magnitude relation between the actually measured chromaticity coordinate and the standard chromaticity coordinate, determining a processing mode to the target pixel unit.

Step 105: determining a maintained color channel whose pixel component maintains constant in the processing mode, wherein the other two color channels than the maintained color channel among the three color channels serve as candidate color channels whose pixel values are regulatable in the processing mode.

By referring to FIG. 1, it can be seen that the G color channel mainly influences the second direction y, and the R color channel and the B color channel mainly influence the first direction x. In the adjustment, it must be maintained that the pixel component of at least one color channel of the three color channels RGB is the maximum pixel value (for example, 1023), and the components of the other two color channels are between 0 and the maximum pixel value, merely by which the display screen can have a high brightness to the largest extent.

In an embodiment of the present disclosure, the maximum pixel value of the R color channel or the B color channel is maintained constant, which includes two cases. If both of the actually measured chromaticity coordinates $x_1$ and $y_1$ are greater than the standard chromaticity coordinates $x_0$ and $y_0$, or, in other words, the adjustment should be in the bottom left direction in the chromaticity-coordinate diagram, then it is required to maintain the B color channel constant as the largest, and merely the pixel components of the R color channel and the G color channel can be changed. In the other case, the maximum pixel value of the R color channel is maintained constant, and merely the pixel components of the B color channel and the G color channel can be changed.

In practical applications, the process may include, in advance, according to the magnitude relation between the actually measured chromaticity coordinate $(x_1,y_1)$ and the standard chromaticity coordinate $(x_0,y_0)$, defining different processing modes, and a maintained color channel whose pixel component maintains constant in each of the processing modes. Subsequently, when the steps 104-105 are executed, the process may include, according to the above-described pre-defined corresponding relation, i.e., the corresponding relations of the actually measured chromaticity coordinate $(x_1,y_1)$ and the standard chromaticity coordinate $(x_0,y_0)$, the processing mode and the maintained color channel, determining which processing mode is used currently, and which color channel is the color channel that is required to maintain the pixel component constant. The corresponding relation may refer to the following Table 3.

TABLE 3

| magnitude relation between chromaticity coordinates | processing mode | maintained channel |
|---|---|---|
| $x_1 = x_0$ | 0 | R |
| $x_1 > x_0$ and $y_1 >= y_0$ | 1 | B |
| $x_1 < x_0$ and $y_1 <= y_0$ | 2 | R |
| $x_1 < x_0$ and $y_1 >= y_0$ | 3 | R |
| $x_1 > x_0$ and $y_1 <= y_0$ | 4 | R |

Correspondingly, the step 102 may particularly include:

according to the magnitude relation between the actually measured chromaticity coordinate and the standard chromaticity coordinate, by adjusting the pixel component of at least one of the candidate color channels of the target pixel unit, performing coarse adjustment to coordinate values of the actually measured chromaticity coordinate in the first direction and the second direction, and repeatedly performing the coarse adjustment till both of the differences in the first direction and the second direction between the actually measured chromaticity coordinate obtained after the coarse adjustment and the standard chromaticity coordinate are less than the first preset value.

In other words, after the processing mode has been determined, the maintained color channel in the processing mode is correspondingly determined, and the coarse adjustment can adjust merely the pixel components of the two remaining color channels.

Optionally, in some embodiments, in the step 102, two rounds of coarse adjustment may be performed. Correspondingly, referring to FIG. 3, the step 102 may particularly include:

the first step S1: according to the magnitude relation between the first-direction actually measured coordinate $x_1$ and the first-direction standard coordinate $x_0$, performing a first time of coarse adjustment to the first-direction actually measured coordinate $x_1$;

the second step S2: according to the magnitude relation between the second-direction actually measured coordinate $y_1$ and the second-direction standard coordinate $y_0$, performing a first time of coarse adjustment to the second-direction actually measured coordinate $y_1$;

the third step S3: according to the magnitude relation between the first-direction actually measured coordinate obtained after the coarse adjustment for the first time $x_2$ and the first-direction standard coordinate $x_0$, performing a second time of coarse adjustment to the first-direction actually measured coordinate $x_2$; and the fourth step S4: according to the magnitude relation between the second-direction actually measured coordinate obtained after the coarse adjustment for the first time $y_2$ and the second-direction standard coordinate $y_0$, performing a second time of coarse adjustment to the second-direction actually measured coordinate $y_2$.

In the first step S1, the first direction x may be preliminarily adjusted, to control the difference in the first direction x $\Delta x=|x_1-x_0|$ to be within a certain error, i.e., within the third preset value (for example, 0.008). The first step S1 particularly includes:

S11: from the candidate color channels, determining a first to-be-adjusted color channel with respect to the first direction in the processing mode;

S12: according to a magnitude relation between the first-direction actually measured coordinate and the first-direction standard coordinate, determining a first adjustment trend of a pixel component of the first to-be-adjusted color channel; and S13: according to the first adjustment trend, adjusting the pixel component of the first to-be-adjusted color channel of the target pixel unit, to perform a first time of coarse adjustment to the first-direction actually measured coordinate, and cause a difference between the first-direction actually measured coordinate obtained after the coarse adjustment for the first time and the first-direction standard coordinate to be less than a third preset value.

Referring to the following Table 4, the first step S1 mainly adjusts the x direction, and the pixel components of the R color channel and the B color channel mainly influence the x direction.

TABLE 4

| processing mode | judgment condition | adjustment strategy |
|---|---|---|
| 0 | $x_1 = x_0$ | Constant |
| 1 | $x_1 > x_0$ | R− |
| 2 | $x_1 < x_0$ | B− |
| 3 | $x_1 < x_0$ | B− |
| 4 | $x_1 > x_0$ | B+ |

In the processing mode 0, $x_1=x_0$, and therefore none of the color channels in that mode is adjusted.

In the processing mode 1, $x_1>x_0$, and it is required to maintain the B color channel constant, and merely change the R color channel or the G color channel. The R color channel mainly influences the x direction, and therefore the pixel component of the R color channel may be reduced, to reduce $x_1$.

In the processing mode 2 and the processing mode 3, $x_1<x_0$, and it is required to maintain the R color channel constant, and merely change the B color channel or the G color channel. The B color channel mainly influences the x direction, and therefore the pixel component of the B color channel may be reduced, to increase $x_1$.

In the processing mode 4, $x_1>x_0$, and it is required to maintain the R color channel constant, and merely change the B color channel or the G color channel. The B color channel influences the x direction, and therefore the pixel component of the B color channel may be increased, to reduce $x_1$.

After the adjustment of the first step S1, $x_1$ has been adjusted into $x_2$.

Optionally, in the first step S1, the adjustment step length of the pixel components may refer to the following Table 5. The adjustment step length of the pixel components refers to the adjustment amount of a single time of the pixel components.

TABLE 5

| condition | adjustment step length |
|---|---|
| $\Delta x >= 0.012$ | 30 |
| $\Delta x >= 0.008$ | 25 |

In an embodiment of the present disclosure, the first step S1 may be executed at least one time, till Δx has been controlled to be within the third preset value. If Δx is higher, the adjustment step length is higher, and if Δx is lower, the adjustment step length is lower. Such an adjustment step length can prevent excessive one-step adjustment in the coarse adjustment for the first time in the x direction, to prevent excessive increasing of the time quantity of the adjustment, whereby Δx can be quickly converged.

In the second step S2, the second direction y may be preliminarily adjusted, to control the difference in the second direction y $\Delta y=|y_1-y_0|$ to be within a certain error, i.e., within the third preset value (for example, 0.008). The second step S2 particularly includes:

S21: from the candidate color channels, determining a second to-be-adjusted color channel with respect to the second direction in the processing mode;

S22: according to a magnitude relation between the second-direction actually measured coordinate and the second-direction standard coordinate, determining a second adjustment trend of a pixel component of the second to-be-adjusted color channel; and S23: according to the second adjustment trend, adjusting the pixel component of the second to-be-adjusted color channel of the target pixel unit, to perform a second time of coarse adjustment to the second-direction actually measured coordinate, and cause a difference between the second-direction actually measured coordinate obtained after the coarse adjustment for the first time and the second-direction standard coordinate to be less than the third preset value.

Referring to the following Table 6, the second step S2 mainly adjusts the y direction, and the pixel component of the G color channel mainly influences the y direction. By the adjustment in the first step S1, the x direction has been improved, while the y direction has been influenced differently.

TABLE 6

| processing mode | judgment condition | adjustment strategy |
|---|---|---|
| 0 | $y_1 < y_0$ | G+ |
| | $y_1 > y_0$ | G− |
| 1 | $y_1 > y_0$ | G− |
| 2 | $y_1 < y_0$ | G+ |
| | $y_1 > y_0$ | G− |
| 3 | $y_1 > y_0$ | G− |
| 4 | $y_1 < y_0$ | G+ |

Regarding the processing mode 0, it is not adjusted in S1, and the magnitude relation between $y_1$ and $y_0$ has two cases. If $y_1<y_0$, it is required to increase the pixel component of the G color channel, to increase $y_1$. If $y_1>y_0$, it is required to reduce the pixel component of the G color channel, to reduce $y_1$.

In the processing mode 1, $y_1>=y_0$, and after the pixel component of the R color channel was reduced in S1, $y_1$ was increased. Therefore, in S2, it is required to reduce the pixel component of the G color channel, to reduce $y_1$.

In the processing mode 2, $y_1<=y_0$, and after the pixel component of the B color channel was reduced in S1, $y_1$ was increased. However, at this point, the magnitude relation between $y_1$ and $y_0$ cannot be determined. Therefore, in S2 it is also required to distinguish two cases. If $y_1<y_0$, it is required to increase the pixel component of the G color channel, to increase $y_1$. If $y_1>y_0$, it is required to reduce the pixel component of the G color channel, to reduce $y_1$.

In the processing mode 3, $y_1>=y_0$, and after the pixel component of the B color channel was reduced in S1, $y_1$ was increased. Therefore, in S2, it is required to reduce the pixel component of the G color channel, to reduce $y_1$.

In the processing mode 4, $y_1<=y_0$, and after the pixel component of the B color channel was increased in S1, $y_1$ was reduced. Therefore, in S2, it is required to increase the pixel component of the G color channel, to increase $y_1$.

After the adjustment of the second step S2, $y_1$ has been adjusted into $y_2$.

Optionally, in the second step S2, the adjustment step length of the pixel components may refer to the following Table 7.

TABLE 7

| condition | adjustment step length |
|---|---|
| Δy >= 0.01 | 20 |
| Δy >= 0.009 | 15 |
| Δy >= 0.008 | 10 |

In an embodiment of the present disclosure, the second step S2 may be executed at least one time, till Δy has been controlled to be within the third preset value. If Δy is higher, the adjustment step length is higher, and if Δy is lower, the adjustment step length is lower. Such an adjustment step length can prevent excessive one-step adjustment in the coarse adjustment for the first time in the y direction, to prevent excessive increasing of the time quantity of the adjustment, whereby Δy can be quickly converged.

In the third step S3, the first direction x may be adjusted again, to control the difference in the first direction x $\Delta x=|x_2-x_0|$ to be within a certain error, i.e., within the first preset value (for example, 0.006). The third step S3 particularly includes:

- S31: from the candidate color channels, determining a third to-be-adjusted color channel with respect to the first direction in the processing mode;
- S32: according to the magnitude relation between the first-direction actually measured coordinate and the first-direction standard coordinate, determining a third adjustment trend of a pixel component of the third to-be-adjusted color channel; and
- S33: according to the third adjustment trend, adjusting the pixel component of the third to-be-adjusted color channel of the target pixel unit, to perform a second time of coarse adjustment to the first-direction actually measured coordinate, and cause a difference between the first-direction actually measured coordinate obtained after the coarse adjustment for the second time and the first-direction standard coordinate to be less than the first preset value.

Referring to the following Table 8, the third step S3 mainly adjusts the x direction, and the pixel components of the R color channel and the B color channel mainly influence the x direction. After the adjustments of S1 and S2, both of the x direction and the y direction have been improved, but at this point both of the magnitude relation between $x_2$ and $x_0$ and the magnitude relation between $y_2$ and $y_0$ have become uncertain. Therefore, each of the processing modes is required to be processed in different cases.

TABLE 8

| processing mode | judgment condition | adjustment strategy |
|---|---|---|
| 0 | $x_2 < x_0$ | B− |
| | $x_2 > x_0$ | B+ |
| 1 | $x_2 < x_0$ | R+ |
| | $x_2 > x_0$ | R− |
| 2 | $x_2 < x_0$ | B− |
| | $x_2 > x_0$ | B+ |
| 3 | $x_2 < x_0$ | B− |
| | $x_2 > x_0$ | B+ |
| 4 | $x_2 < x_0$ | B− |
| | $x_2 > x_0$ | B+ |

Regarding the processing mode 1, the magnitude relation between $x_2$ and $x_0$ has two cases. If $x_2<x_0$, because the pixel component of the B color channel maintains constant, it is required to increase the pixel component of the R color channel, to increase $x_2$. If $x_2>x_0$, because the pixel component of the B color channel maintains constant, it is required to reduce the pixel component of the R color channel, to reduce $x_2$.

Regarding the processing modes 0, 2, 3 and 4, the magnitude relation between $x_2$ and $x_0$ also has two cases. If $x_2<x_0$, because the pixel component of the R color channel maintains constant, it is required to reduce the pixel component of the B color channel, to increase $x_2$. If $x_2>x_0$, because the pixel component of the R color channel maintains constant, it is required to increase the pixel component of the B color channel, to reduce $x_2$.

After the adjustment of the third step S3, $x_2$ has been adjusted into $x_3$.

Optionally, in the third step S3, the adjustment step length of the pixel components may refer to the following Table 9.

TABLE 9

| condition | adjustment step length |
|---|---|
| Δx >= 0.008 | 8 |
| Δx >= 0.007 | 7 |
| Δx >= 0.006 | 6 |

In an embodiment of the present disclosure, the third step S3 may be executed at least one time, till Δx has been further controlled to be within the first preset value. If Δx is higher, the adjustment step length is higher, and if Δx is lower, the adjustment step length is lower. Such an adjustment step length can prevent excessive one-step adjustment in the coarse adjustment for the second time in the x direction, to prevent excessive increasing of the time quantity of the adjustment, whereby Δx can be quickly converged.

In the fourth step S4, the second direction y may be adjusted again, to control the difference in the second direction y $\Delta y=|y_2-y_0|$ to be within a certain error, i.e., within the first preset value (for example, 0.006). The fourth step S4 particularly includes:

- S41: from the candidate color channels, determining a fourth to-be-adjusted color channel with respect to the second direction in the processing mode;
- S42: according to the magnitude relation between the second-direction actually measured coordinate and the second-direction standard coordinate, determining a fourth adjustment trend of a pixel component of the fourth to-be-adjusted color channel; and
- S43: according to the fourth adjustment trend, adjusting the pixel component of the fourth to-be-adjusted color channel of the target pixel unit, to perform the second time of coarse adjustment to the second-direction actually measured coordinate, and cause a difference between the second-direction actually measured coordinate obtained after the coarse adjustment for the second time and the second-direction standard coordinate to be less than the first preset value.

Referring to the following Table 10, the fourth step S4 mainly adjusts the y direction, and the pixel component of the G color channel mainly influences the y direction. As stated above, by the preceding adjustments, the magnitude relation between $y_2$ and $y_0$ has become uncertain. Therefore, each of the processing modes is required to be processed in different cases.

TABLE 10

| processing mode | judgment condition | adjustment strategy |
|---|---|---|
| 0 | $y_2 < y_0$ | G+ |
| | $y_2 > y_0$ | G− |
| 1 | $y_2 < y_0$ | G+ |
| | $y_2 > y_0$ | G− |
| 2 | $y_2 < y_0$ | G+ |
| | $y_2 > y_0$ | G− |
| 3 | $y_2 < y_0$ | G+ |
| | $y_2 > y_0$ | G− |
| 4 | $y_2 < y_0$ | G+ |
| | $y_2 > y_0$ | G− |

In the processing modes 0-4, the magnitude relation between $y_2$ and $y_0$ has two cases. If $y_2<y_0$, it is required to increase the pixel component of the G color channel, to increase $y_2$. If $y_2>y_0$, it is required to reduce the pixel component of the G color channel, to reduce $y_2$.

After the adjustment of the fourth step S4, $y_2$ has been adjusted into $y_3$.

Optionally, in the fourth step S4, the adjustment step length of the pixel components may refer to the following Table 11.

TABLE 11

| condition | adjustment step length |
|---|---|
| Δy >= 0.008 | 8 |
| Δy >= 0.007 | 7 |
| Δy >= 0.006 | 6 |

In an embodiment of the present disclosure, the fourth step S4 may be executed at least one time, till Δy has been further controlled to be within the first preset value. If Δy is higher, the adjustment step length is higher, and if Δy is lower, the adjustment step length is lower. Such an adjustment step length can prevent excessive one-step adjustment in the coarse adjustment for the second time in the y direction, to prevent excessive increasing of the time quantity of the adjustment, whereby Δy can be quickly converged.

Optionally, referring to FIG. 3, in some embodiments, the step 105 may particularly include:

Step 1051: according to the magnitude relation between the actually measured chromaticity coordinate obtained after the coarse adjustment $(x_3,y_3)$ and the standard chromaticity coordinate $(x_0,y_0)$, performing fine adjustment of a first stage;

Step 1052: circularly executing the first stage, till a preset condition is satisfied or a preset execution time quantity K is reached, wherein the preset condition includes that both of the difference between the first-direction actually measured coordinate obtained after the fine adjustment and the first-direction standard coordinate $x_0$ and the difference between the second-direction actually measured coordinate obtained after the fine adjustment and the second-direction standard coordinate $y_0$ are less than the second preset value; and Step 1053: if the execution time quantity of the first stage reaches the preset execution time quantity K and still does not satisfy the preset condition, according to the magnitude relation between the actually measured chromaticity coordinate obtained after the fine adjustment at the first stage and the standard chromaticity coordinate, and a current magnitude relation between a first difference Δx and a second difference Δy, performing fine adjustment of a second stage, till the preset condition is satisfied, wherein the first difference is the current difference between the first-direction actually measured coordinate and the first-direction standard coordinate, and the second difference is the current difference between the second-direction actually measured coordinate and the second-direction standard coordinate.

The steps 1051-1053 are comprehensive adjustments in the x direction and the y direction, the pixel components of the R and B color channels mainly influence the x direction, and the pixel component of the G color channel mainly influences the y direction. By the adjustments before the step 105, both of the x direction and the y direction have been improved, whereby the difference between the actually measured chromaticity coordinate and the standard chromaticity coordinate is controlled to be within a certain range. Therefore, the step 105 mainly performs the final precise adjustment, to quickly control both of the differences between the actually measured chromaticity coordinate and the standard chromaticity coordinate in the x direction and the y direction to be within the finally required ranges.

Referring to Table 12, the fine adjustment in the first stage of the step 1051 (i.e., the case of ROUND<=4 in Table 12) may particularly be performed in the following mode, including:

P1-1: according to a magnitude relation between the first-direction actually measured coordinate obtained after the coarse adjustment and the first-direction standard coordinate, and a magnitude relation between the second-direction actually measured coordinate obtained after the coarse adjustment and the second-direction standard coordinate, determining a fifth to-be-adjusted color channel in the processing mode, and a fifth adjustment trend of a pixel component of the fifth to-be-adjusted color channel.

P1-2: according to the fifth adjustment trend, adjusting the pixel component of the fifth to-be-adjusted color channel of the target pixel unit, to perform fine adjustment to the first-direction actually measured coordinate and the second-direction actually measured coordinate at a same time.

Referring to Table 12, the fine adjustment in the second stage of the step 1053 (i.e., the case of ROUND>4 in Table 12) may particularly be performed in the following mode, including:

P2-1: according to a magnitude relation between the first difference and the second difference, determining a sixth to-be-adjusted color channel in the processing mode.

P2-2: according to a magnitude relation between the first-direction actually measured coordinate obtained after the coarse adjustment and the first-direction standard coordinate, and a magnitude relation between the second-direction actually measured coordinate obtained after the coarse adjustment and the second-direction standard coordinate, determining a sixth adjustment trend of a pixel component of the sixth to-be-adjusted color channel.

Referring to Table 12, if the first difference is greater than or equal to the second difference, determining the sixth to-be-adjusted color channel in the processing mode to be the candidate color channel that has the largest influence on the first direction x in the processing mode. If the first difference is less than the second difference, determining the sixth to-be-adjusted color channel in the processing mode to be the candidate color channel that has the largest influence on the second direction y in the processing mode.

P2-3: according to the sixth adjustment trend, adjusting the pixel component of the sixth to-be-adjusted color channel of the target pixel unit, to perform fine adjustment to the first-direction actually measured coordinate and the second-direction actually measured coordinate at a same time.

TABLE 12

| processing mode | judgment condition | | | adjustment strategy |
|---|---|---|---|---|
| 1 | $x_3 <= x_0$ | ROUND <= 4 | | R+ G+ |
| | $y_3 <= y_0$ | ROUND > 4 | $\Delta x >= \Delta y$ | R+ |
| | | | $\Delta x < \Delta y$ | G+ |
| | $x_3 <= x_0$ | ROUND <= 4 | | R+ G− |
| | $y_3 >= y_0$ | ROUND > 4 | $\Delta x >= \Delta y$ | R+ |
| | | | $\Delta x < \Delta y$ | G− |
| | $x_3 >= x_0$ | ROUND <= 4 | | R− G+ |
| | $y_3 <= y_0$ | ROUND > 4 | $\Delta x >= \Delta y$ | R− |
| | | | $\Delta x < \Delta y$ | G+ |
| | $x_3 >= x_0$ | ROUND <= 4 | | R− G− |
| | $y_3 >= y_0$ | ROUND > 4 | $\Delta x >= \Delta y$ | R− |
| | | | $\Delta x < \Delta y$ | G− |
| 0/2/3/4 | $x_3 <= x_0$ | ROUND <= 4 | | B− |
| | $y_3 <= y_0$ | ROUND > 4 | $\Delta x >= \Delta y$ | B− |
| | | | $\Delta x < \Delta y$ | G+ |
| | $x_3 <= x_0$ | ROUND <= 4 | | G− |
| | $y_3 <= y_0$ | ROUND > 4 | $\Delta x >= \Delta y$ | B− |
| | | | $\Delta x < \Delta y$ | G− |
| | $x_3 >= x_0$ | ROUND <= 4 | | G+ |
| | $y_3 <= y_0$ | ROUND > 4 | $\Delta x >= \Delta y$ | B+ |
| | | | $\Delta x < \Delta y$ | G+ |
| | $x_3 >= x_0$ | ROUND <= 4 | | B+ |
| | $y_3 >= y_0$ | ROUND > 4 | $\Delta x >= \Delta y$ | B+ |
| | | | $\Delta x < \Delta y$ | G− |

It should be particularly noted that, in the judgment conditions of Table 12, $x_3=x_0$ and $y_3=y_0$ cannot be satisfied at a same time.

Particularly, the above steps will be described with reference to Table 12. In practical applications, the parameter ROUND may be used to express the time quantity of the calibration in the fine-adjustment stage. In order to accelerate the calibration, the fine adjustment may be performed in two stages:

If ROUND<=K, the fine adjustment of a first stage is performed, including: by comprehensively considering the magnitude relation between the actually measured chromaticity coordinate and the standard chromaticity coordinate, adjusting in different cases, circularly executing the first stage. If the preset condition has been satisfied when the calibration time quantity does not exceed K times (for example, 4 times), then ending the color-temperature calibration, and if the preset condition is still not satisfied when the calibration time quantity reaches K times, then executing the subsequent steps.

If ROUND>K, the fine adjustment of a second stage is performed, including: preferentially processing the direction in which the coordinate difference is higher. Therefore, it is required to compare the magnitudes of Δx and Δy, wherein a larger numerical value indicates a larger difference in the direction, and that direction is preferentially adjusted.

Referring to Table 12 (taking K=4 as an example), in the processing mode 1, the pixel component of the B color channel maintains constant, and merely the pixel component of the R or G color channel is changed. If ROUND<=4, the adjustment is performed by comprehensively considering the magnitudes of x and y.

When ROUND=1, the magnitude relation between the actually measured chromaticity coordinate and the standard chromaticity coordinate has four cases. If, at this point, it is satisfied that "$x_3<=x_0$ and $y_3<=y_0$", then it is required to increase $x_3$ and increase $y_3$. Although that can be realized by reducing the pixel component of the B color channel, in the processing mode 1 it is required to maintain the pixel component of the B color channel constant, and therefore that may be realized by increasing the pixel components of the R and G color channels. Subsequently, ROUND=2, then, according to the magnitude relation between the actually measured chromaticity coordinate and the standard chromaticity coordinate at this point, the R or G color channel is adjusted. Subsequently ROUND=3, and the rest may be done in the same manner. When ROUND=5, it is started to preferentially process the direction in which the difference is higher. The magnitudes of Δx and Δy are compared. If Δx is higher, then the R color channel is adjusted to optimize the x direction, and if Δy is higher, then the G color channel is adjusted to optimize the y direction, till both of Δx and Δy have been controlled to be within the range less than the first preset value (for example 0.001), i.e., the adjustment step length=0, which indicates that no adjustment is required.

In all of the processing modes 0, 2, 3 and 4, the pixel component of the R color channel maintains constant, and merely the pixel component of the B or G color channel is changed. If ROUND<=4, the adjustment is performed by comprehensively considering the magnitude relation between the actually measured chromaticity coordinate and the standard chromaticity coordinate in the two directions.

When ROUND=1, the magnitude relation between the actually measured chromaticity coordinate and the standard chromaticity coordinate has four cases. If, at this point, it is satisfied that "$x_3<=x_0$ and $y_3<=y_0$", then it is required to increase $x_3$ and increase $y_3$. That may be realized by reducing the pixel component of the B color channel. Subsequently, ROUND=2, then, according to the magnitude relation between the actually measured chromaticity coordinate and the standard chromaticity coordinate at this point, the B or G color channel is adjusted. Subsequently ROUND=3, and the rest may be done in the same manner. When ROUND=5, it is started to preferentially process the direction in which the difference is higher. The magnitudes of Δx and Δy are compared. If Δx is higher, then the B color channel is adjusted to optimize the x direction, and if Δy is higher, then the G color channel is adjusted to optimize the y direction, till both of Δx and Δy have been controlled to be within the range less than the first preset value (for example 0.001), i.e., the adjustment step length=0, which indicates that no adjustment is required.

Optionally, in this step, the adjustment step length of the pixel components may refer to the following Table 13.

TABLE 13

| condition | adjustment step length |
|---|---|
| $\Delta x/\Delta y >= 0.005$ | 5 |
| $\Delta x/\Delta y >= 0.001$ | 1 |
| $\Delta x/\Delta y < 0.001$ | 0 |

In an embodiment of the present disclosure, the color temperature may be calibrated by using the above steps, to improve the image quality of the display screen. Further, in some embodiments, the method may also include, based on the above steps of the color-temperature calibration, also calibrating the peak brightness of the display screen, by integrating both of the functions of calibrating the color temperature and calibrating the peak brightness in software, and performing the calibrations alternately, to complete the calibrations of both of them, to further improve the image quality of the display screen.

The adjustment of the peak brightness may be performed by changing the duty cycle of the light-source electric signal of the display screen, wherein the light-source electric signal refers to the current signal of the backlight source of the display screen, and is used to lighten the backlight source. The duty cycle of the light-source electric signal of the display screen may be controlled to change by regulating a Pulse Width Modulation (PWM) signal. In an embodiment, the PWM signal may be outputted by an alternating-current light regulating circuit.

If the duty cycle of the light-source electric signal of the display screen is higher, the brightness of the screen is higher, and if the duty cycle of the light-source electric signal of the display screen is lower, the brightness of the screen is lower. The maximum duty cycle that can be set may be measured by experimentation. If that numerical value is exceeded, although the screen has a very high brightness, the brightness is unstable, and the excessively high energy might burn the display screen to cause danger. Therefore, in the adjustment of the peak brightness, the regulatable range of the duty cycle must be known by experimentation or by other means. Because of the limitation by the duty cycle, the brightnesses of some display screens can reach 1000 nits, while some cannot reach 1000 nits. If that cannot be reached, merely a permittable maximum brightness can be set.

The maximum value of the duty cycle can reach 1500 (0-1500 represent 0%-100%). However, in order to maintain a stable screen brightness, and guarantee the safety of the displaying system, in some embodiments, the maximum value of the duty cycle preferably does not exceed 1400.

Figure 4:
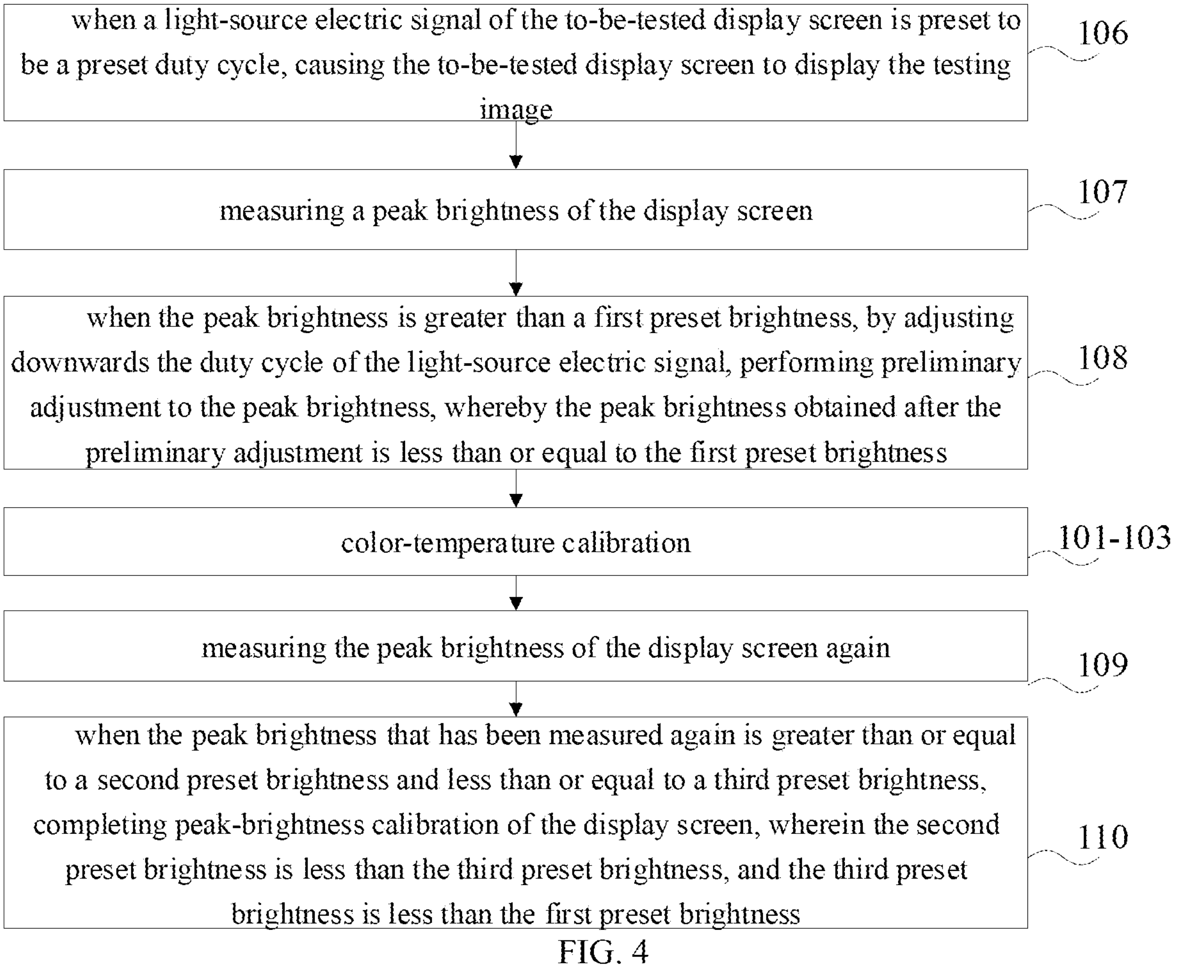
FIG. 4 shows a flow chart of the steps of yet another image-quality calibrating method according to an embodiment of the present disclosure.

Particularly, referring to FIG. 4, in the step 101, before the step of measuring the chromaticity of the target pixel unit in the testing image, the method may further include the following steps:

Step 106: when a light-source electric signal of the to-be-tested display screen is preset to be a preset duty cycle (for example, 1400), causing the to-be-tested display screen to display the testing image.

The preset duty cycle may be the maximum duty cycle permittable by the display screen.

Firstly, the to-be tested display screen may be caused to display the testing image with a permittable maximum peak brightness.

Step 107: measuring a peak brightness of the display screen.

Subsequently, the peak brightness when the display screen is displaying the testing image may be measured by using a brightness meter.

Step 108: when the peak brightness is greater than a first preset brightness (for example, 1200 nits), by adjusting downwards the duty cycle of the light-source electric signal, performing preliminary adjustment to the peak brightness, whereby the peak brightness obtained after the preliminary adjustment is less than or equal to the first preset brightness.

When the peak brightness is greater than a first preset brightness (for example, 1200 nits), that indicates that at this point the peak brightness of the display screen is relatively high, and largely deviates from the required target (for example, 1000 nits). Therefore, the peak brightness may be preliminarily adjusted by adjusting downwards the duty cycle of the light-source electric signal, to preliminarily control the peak brightness to be within the first preset brightness.

When the peak brightness is less than or equal to the first preset brightness (for example, 1200 nits), or, if, after the preliminary adjustment, the peak brightness is less than or equal to the first preset brightness, the color-temperature calibration may be performed firstly.

The above process is one time of the preliminary adjustment to the peak brightness of the display screen. Because, after the color-temperature calibration, the peak brightness decreases, if the final peak brightness is intended to reach at least the required target, it is required to reserve a certain brightness before the color-temperature calibration.

After the color-temperature calibration has been performed with the steps of the color-temperature calibration according to the embodiments of the present disclosure, referring to FIG. 4, the method may further include the following steps:

Step 109: measuring the peak brightness of the display screen again; and

Step 110: when the peak brightness that has been measured again is greater than or equal to a second preset brightness (for example, 1020 nits) and less than or equal to a third preset brightness (for example, 1040 nits), completing peak-brightness calibration of the display screen, wherein the second preset brightness is less than the third preset brightness, and the third preset brightness is less than the first preset brightness.

After the color-temperature calibration, the peak brightness of the display screen may be measured again, to determine the influence on the peak brightness by the color-temperature calibration. The target of the peak-brightness calibration is that the peak brightness is greater than or equal to the second preset brightness and less than or equal to the third preset brightness. Therefore, if the peak brightness that has been measured again is greater than or equal to the second preset brightness and less than or equal to the third preset brightness, then the peak-brightness calibration is ended, and the color-temperature calibration is no longer performed. In other words, the calibrations of the color temperature and the peak brightness of the display screen have been completed at a same time.

In an alternative embodiment, before the step 110, the method may include firstly determining the magnitude relation between the peak brightness that has been measured again and a fourth preset brightness (for example, 1000 nits), wherein the fourth preset brightness<the second preset brightness<the third preset brightness<the first preset brightness. If the peak brightness that has been measured again is less than the fourth preset brightness, that indicates that the display screen has already had a low brightness with a high duty cycle of the light-source electric signal, and it is difficult to reach the required target of the peak brightness by adjusting upwards the duty cycle of the light-source electric signal. Therefore, the calibration of the peak brightness may be ended.

After the color-temperature calibration and the above steps, the peak brightness might not be within the range from the second preset brightness to the third preset brightness, at which point two cases might exist: that the peak brightness that has been measured again is greater than the fourth preset brightness and less than the second preset brightness, and that the peak brightness that has been measured again is greater than the third preset brightness.

If the peak brightness that has been measured again is greater than a fourth preset brightness and less than the second preset brightness, the process may include, by adjusting upwards the duty cycle of the light-source electric signal, performing precise adjustment to the peak brightness, till the peak brightness obtained after the precise adjustment is greater than or equal to the second preset brightness, and less than or equal to the third preset brightness.

If the peak brightness that has been measured again is greater than the third preset brightness, the process may include, by adjusting downwards the duty cycle of the light-source electric signal, performing precise adjustment to the peak brightness, till the peak brightness obtained after the precise adjustment is greater than or equal to the second preset brightness, and less than or equal to the third preset brightness.

However, after the peak brightness has undergone multiple times of the precise adjustment, probably the target still cannot be satisfied. When the time quantity of the adjustment of the duty cycle has been too many (for example, exceeding 500 times) and the calibration target still cannot be satisfied, in order to prevent the image-quality calibrating program from falling within an infinite loop, the calibration may be ended and the image-quality calibrating program may be exited, or else the steps of the precise adjustment continue being circularly performed.

After the peak brightness has been adjusted multiple times, in order to prevent changing of the color temperature, it is required to perform the color-temperature calibration again. The color-temperature calibration and the peak-brightness calibration are alternately performed, till, after the peak-brightness calibration, both of the color temperature and the peak brightness reach the required targets.

Based on that, after the precise adjustment of the peak brightness, the method may further include the following steps:

- when the peak brightness obtained after the precise adjustment is greater than or equal to the second preset brightness and less than or equal to the third preset brightness, calibrating a color temperature of the display screen again, till it is satisfied that both of the differences in the first direction and the second direction between the actually measured chromaticity coordinate obtained after the fine adjustment and the standard chromaticity coordinate are less than the second preset value;
- further measuring the peak brightness of the display screen; and
- when the peak brightness that has been further measured is greater than or equal to the second preset brightness and less than or equal to the third preset brightness, completing the color-temperature calibration and the peak-brightness calibration.

Figure 5:
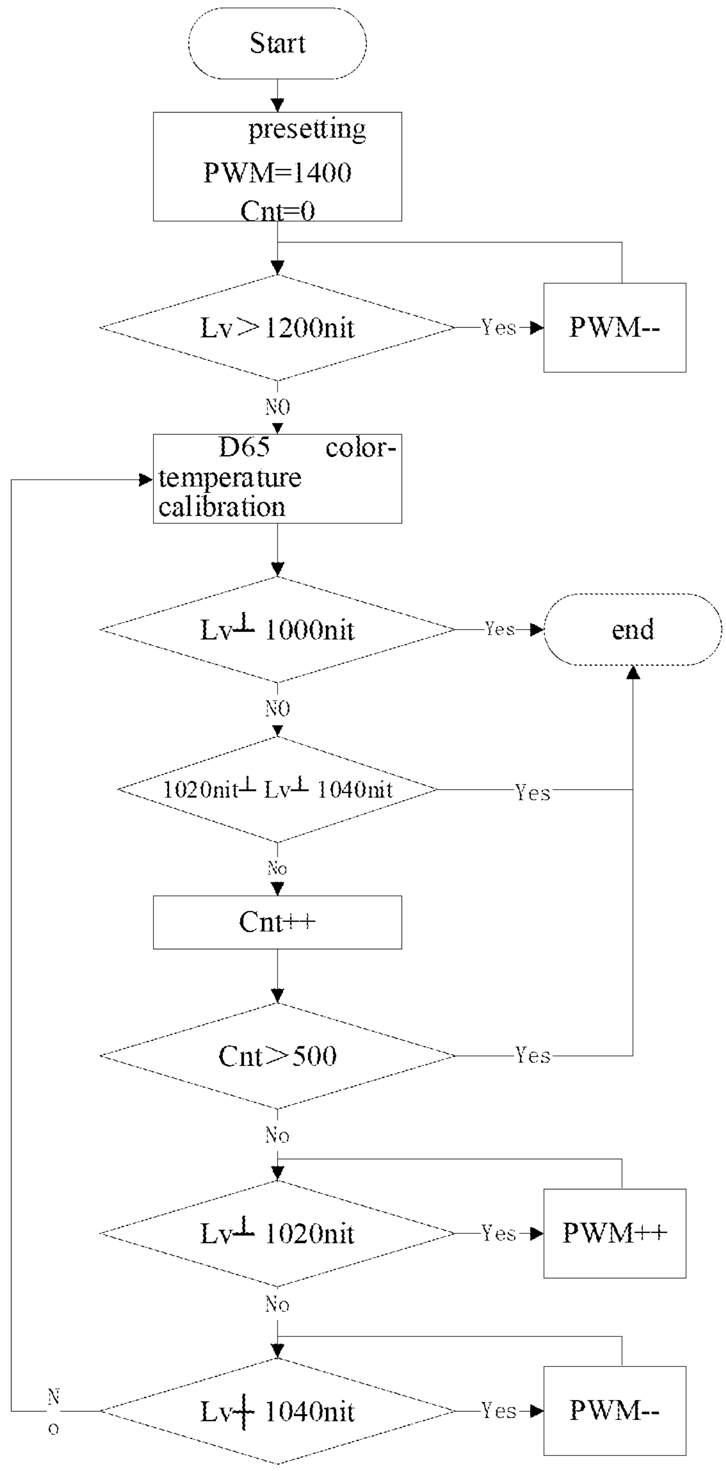
FIG. 5 shows an illustrative flow chart of the image-quality calibration according to an embodiment of the present disclosure.

Referring to FIG. 5, FIG. 5 provides an example of the image-quality calibration that combines the peak-brightness calibration and the color-temperature calibration. In the present example, the process of the peak-brightness calibration is emphatically demonstrated. In the present example, the target color temperature is D65, the preset duty cycle is =1400, the first preset brightness is =1200 nits, the second preset brightness is =1020 nits, the third preset brightness is =1040 nits, and the fourth preset brightness is =1000 nits. In addition, in the present example, the parameter Cnt is used to represent the time quantity of the adjustment of the duty cycle.

Referring to FIG. 5, taking the case as an example where the target is a color temperature of D65 and a peak brightness of 1000 nits, the calibration may be reserved as approximately 30 nits, and because there is a loss in the brightness of the screen after the long-term usage, the target peak brightness is set to be within the range of 1020-1040 nits.

Firstly, it is preset that the duty cycle PWM=1400, and Cnt=0.

If, at this point, the peak brightness Lv is greater than 1200 nits, then PWM is gradually reduced, till the peak brightness Lv has been controlled to be within 1000 nits-1200 nits. Because, after the D65 color-temperature calibration, the peak brightness Lv decreases, if it is intended to reach 1000 nits, it is required to reserve a certain brightness before the color-temperature calibration. If, at this point, the peak brightness Lv is less than or equal to 1200 nits, then the color-temperature calibration is directly performed.

When the peak brightness Lv has been controlled to be within 1000 nits-1200 nits, the color temperature starts to be calibrated. After the target of the color-temperature calibration has been satisfied, the peak brightness Lv is measured again. Firstly, it is determined whether, at this point, the peak brightness Lv is less than or equal to 1000 nits. If, at this point, the peak brightness Lv is less than or equal to 1000 nits, that indicates that it is difficult for the display screen to be greater than 1000 nits by adjusting PWM, and the calibration may be ended. If, at this point, the peak brightness Lv is greater than 1000 nits, then it is further determined whether, at this point, the peak brightness Lv reaches 1020-1040 nits. If that is reached, then the peak-brightness calibration is ended. If that is not reached, but the time quantity of the adjustment has exceeded 500 times (i.e., Cnt>500), in order to prevent the image-quality calibrating program from falling within an infinite loop, the program is exited, or else the following adjustment is further performed.

If the peak brightness Lv that has been measured again is less than 1020 nits, then PWM is gradually increased, and if the peak brightness Lv that has been measured again is greater than 1040 nits, then PWM is gradually reduced, till finally the peak brightness reaches 1020-1040 nits. At this point, because the calibration has been performed multiple times, in order to prevent changing of the color temperature, the color temperature should be calibrated again. It is further measured whether the brightness still reaches 1020-1040 nits, and if it is reached, then the image-quality calibrating program is exited, or else subsequently the calibrations of the peak brightness and the color temperature are further performed.

The other methods of the peak-brightness calibration in the gamma mode are similar. However, the color-temperature characteristic of a peak brightness lower than 600 nits is different from the color-temperature characteristic of 1000 nits, and the color-temperature characteristic below 600 nits is substantially the same. Therefore, in the gamma mode below 600 nits, the color temperature may employ the same one set of calibration parameters (for example, the adjustment step length, the first preset value and the second preset value), and it is merely required to modify the value of the duty cycle of the light-source electric signal to adjust the peak brightness.

Figure 6:
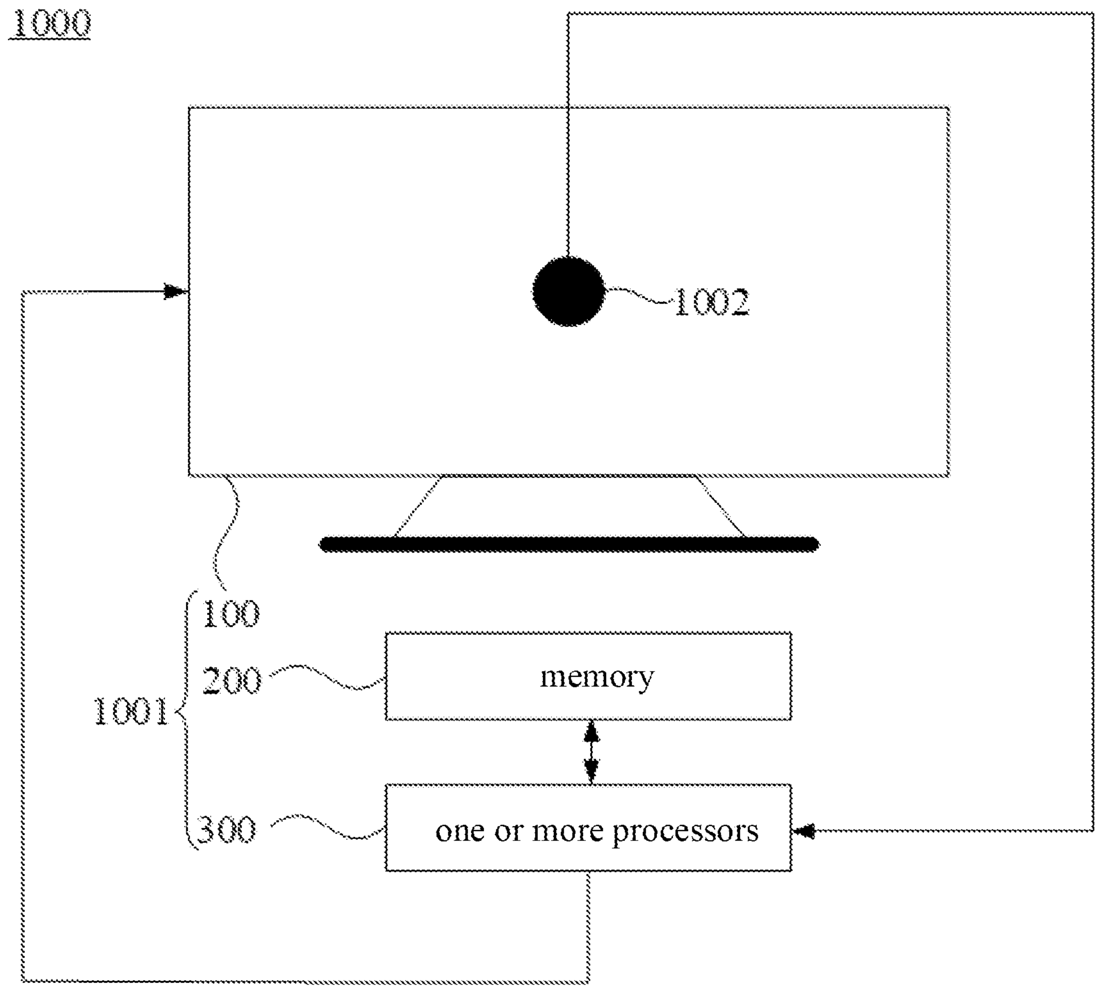
FIG. 6 shows a schematic structural diagram of an image-quality calibrating system according to an embodiment of the present disclosure.

An embodiment of the present disclosure further discloses an image-quality calibrating system 1000. As shown in FIG. 6, the image-quality calibrating system 1000 includes: a displaying terminal 1001 and a colorimeter 1002. The displaying terminal 1001 includes a display screen 100, a memory 200 and one or more processors 300.

The display screen 100 is configured for displaying a testing image.

The colorimeter 1002 is configured for measuring a chromaticity of a target pixel unit in the testing image, to obtain an actually measured chromaticity coordinate of the target pixel unit, and transmitting the obtained actually measured chromaticity coordinate to the one or more processors 300.

The memory 200 stores one or more programs, and the programs, when executed by the one or more processors 300, implement the steps of the color-temperature calibration in the image-quality calibrating method stated above.

The one or more processors 300, by executing the one or more programs stored in the memory 200, may control the display screen 100 to display an image, control the colorimeter 1002 to measure the chromaticity of the image displayed by the display screen 100, and control the image-quality calibrating system 1000 to perform the color-temperature calibration to the display screen 100.

Herein, the displaying terminal 1001 may be any device that is applied to the field of displaying and displays a mobile (for example, a video) or fixed (for example, a stationary image) image, and a textual or pictorial image. More particularly, it is expected that the embodiments may be embodied in multiple types of electronic devices. The multiple types of electronic devices include but are not limited to a mobile phone, a wireless device, a portable android device (abbreviated as PAD), a hand-held or portable computer, a GPS (Global Positioning System) receiver/navigator, a camera, an MP4 (fully referred to as MPEG-4 Part 14) video player, a video camera, a television monitor, a flat-panel display, a computer monitor, and an aesthetics device (for example, a display for displaying the image of a jewel).

The processors 300 may be embodied with one or more Application Specific Integrated Circuits (ASIC), Digital Signal Processors (DSP), Digital Signal Processing Devices (DSPD), Programmable Logic Devices (PLD), Field-Programmable Logic Gate Arrays (FPGA), controllers, micro-controllers, microprocessors or other electronic elements.

In addition, the one or more processors 300 of the image-quality calibrating system 1000 may be integrated with the memory 200, may also be independently provided, and may also employ another structure, which is not limited in the embodiments of the present disclosure.

The memory 200 is configured for storing the programs, and may be embodied as any type of volatile or non-volatile storage devices or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory and a flash memory.

Figure 7:
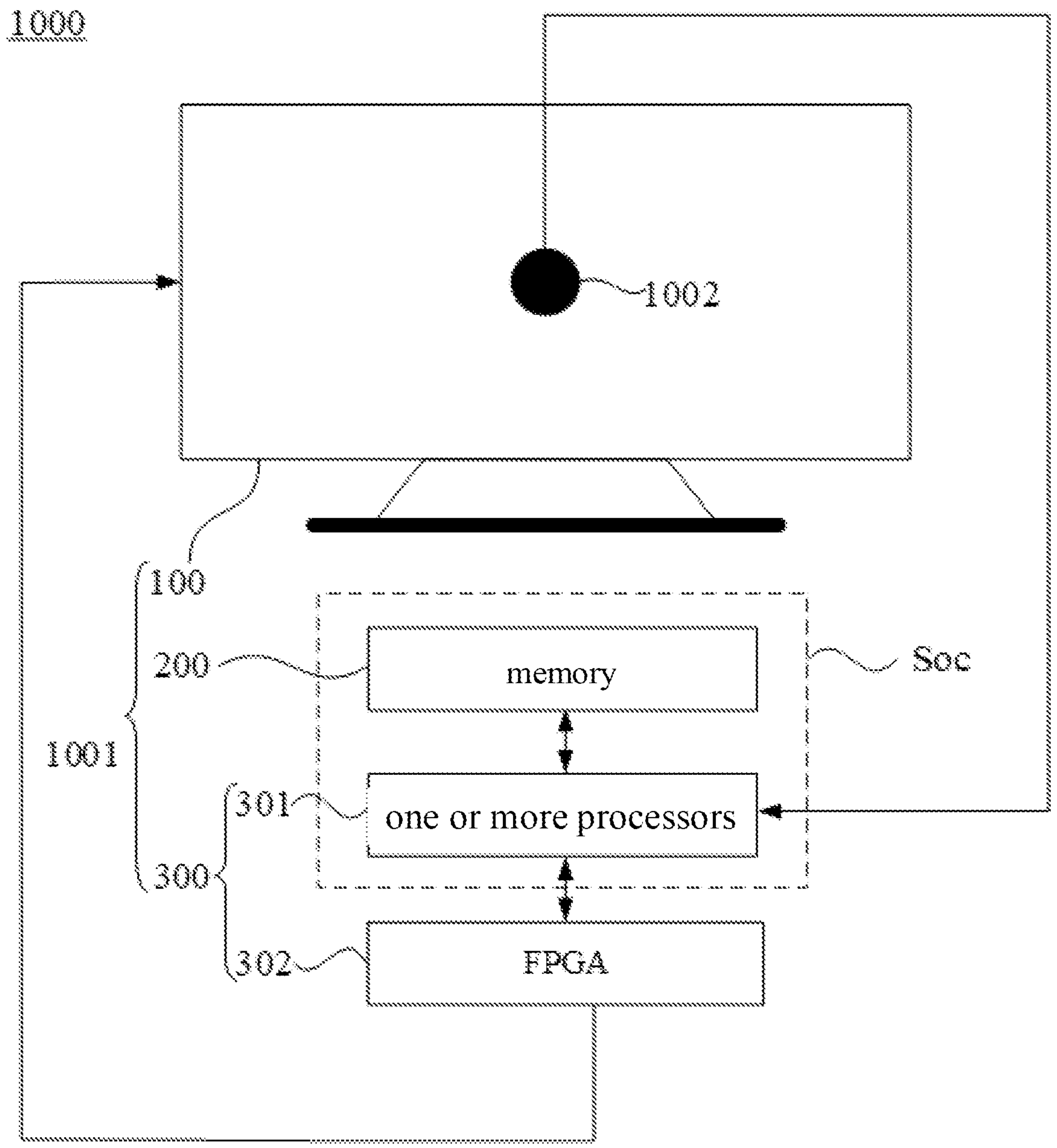
FIG. 7 shows a schematic structural diagram of another image-quality calibrating system according to an embodiment of the present disclosure.

Optionally, as shown in FIG. 7, the displaying terminal 1001 further includes a System On Chip Soc (System-on-a-chip). The memory 200 is integrated in the system on chip.

The one or more processors 300 include: a field-programmable logic gate array (FPGA) 302, and at least one processor 301 integrated in the system on chip.

The at least one processor 301 is coupled to the colorimeter 1002 and the FPGA 302, and the at least one processor 301 is configured for receiving the actually measured chromaticity coordinate of the target pixel unit transmitted by the colorimeter 1002, according to the actually measured chromaticity coordinate, determining the adjustment amount of the pixel component of at least one color channel of the target pixel unit, and transmitting the pixel component obtained after the adjustment of the target pixel unit to the FPGA 302.

The FPGA 302 is coupled to the display screen 100, and is configured for, according to the pixel component obtained after the adjustment of the target pixel unit, driving the display screen 100 to display.

The system on chip refers to a complete system integrated in a single chip. The system includes at least a central processing unit CPU, a memory and a peripheral circuit. The system is, for example, a Linux system.

The colorimeter 1002 is, for example, a CA-410 color analyzer. The colorimeter 1002 may be coupled to the processor 301 in the system on chip via a USB interface or an LAN port. The processor 301 may receive the actually measured chromaticity coordinate of the target pixel unit transmitted by the colorimeter 1002, according to the actually measured chromaticity coordinate, determine the adjustment amount of a pixel component of the target pixel unit, and transmit the pixel component obtained after the adjustment of the target pixel unit to the FPGA 302. The FPGA 302 is coupled to the display screen 100, and may, according to the pixel component obtained after the adjustment of the target pixel unit, driving the display screen 100 to display.

Further optionally, the system on chip, the FPGA 302 and the display screen 100 are of an integral structure.

Figure 8:
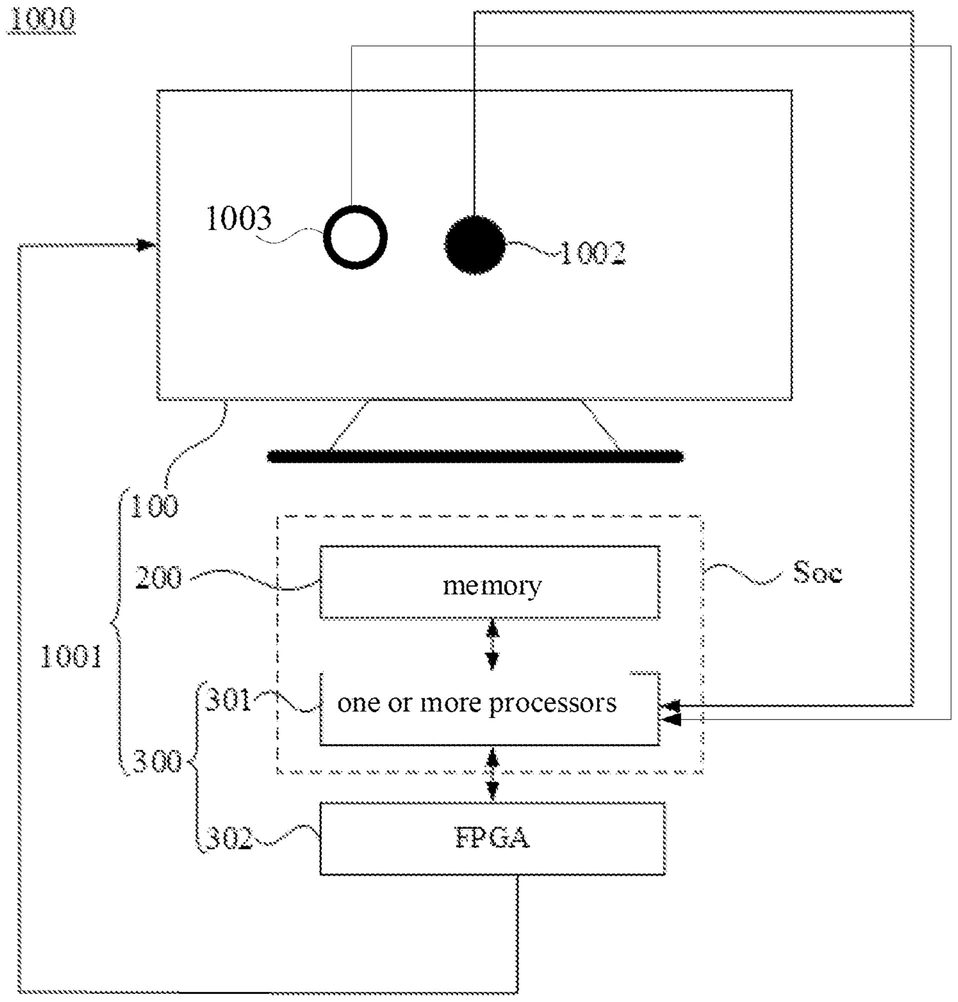
FIG. 8 shows a schematic structural diagram of yet another image-quality calibrating system according to an embodiment of the present disclosure.

In addition, in order to enable the image-quality calibrating system 1000 to perform the peak-brightness calibration to the display screen 100, as shown in FIG. 8, in some embodiments, the image-quality calibrating system 1000 may further include a brightness meter 1003.

The display screen 100 is further configured for, when a light-source electric signal is preset to be a preset duty cycle, displaying the testing image.

The brightness meter 1003 is configured for measuring a peak brightness of the display screen, and transmitting the measured peak brightness to the at least one processor 301.

The at least one processor 301 is coupled to the brightness meter 1003, and the programs, when executed by the one or more processors, implement the steps of the peak-brightness calibration in the image-quality calibrating method stated above.

Correspondingly, the at least one processor 301 may be further configured for, before the color-temperature calibration, receiving the peak brightness transmitted by the brightness meter, according to the peak brightness, determining a duty-cycle preliminary adjustment amount of the light-source electric signal, and transmitting the duty-cycle preliminary adjustment amount to the FPGA 302.

The FPGA 302 may be further configured for, according to the duty-cycle preliminary adjustment amount, performing preliminary adjustment to the duty cycle of the light-source electric signal of the display screen 100, and according to the duty cycle of the light-source electric signal obtained after the preliminary adjustment, driving the display screen 100 to display.

The at least one processor 301 is further configured for, after the color-temperature calibration, receiving the peak brightness measured again that is transmitted by the brightness meter, according to the peak brightness measured again, determining a duty-cycle fine adjustment amount of the light-source electric signal, and transmitting the duty-cycle fine adjustment amount to the FPGA 302.

The FPGA 302 is further configured for, according to the duty-cycle fine adjustment amount, performing precise adjustment to the duty cycle of the light-source electric signal of the display screen 100, and according to the duty cycle of the light-source electric signal obtained after the precise adjustment, driving the display screen 100 to display.

An embodiment of the present disclosure further discloses a non-transitory computer-readable storage medium, wherein the storage medium stores a computer program instruction, and the computer program instruction, when executed in the image-quality calibrating system stated above, causes the image-quality calibrating system to implement one or more of the steps of the image-quality calibrating method stated above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. An image-quality calibrating method, wherein the method comprises:

when a to-be-tested display screen is displaying a testing image, measuring a chromaticity of a target pixel unit in the testing image, to obtain an actually measured chromaticity coordinate of the target pixel unit;

according to a magnitude relation between the actually measured chromaticity coordinate and a standard chromaticity coordinate, by adjusting a pixel component of at least one color channel of the target pixel unit, performing coarse adjustment to coordinate values of the actually measured chromaticity coordinate in a first direction and a second direction, and repeatedly performing the coarse adjustment till both of differences in the first direction and the second direction between the actually measured chromaticity coordinate obtained after the coarse adjustment and the standard chromaticity coordinate are less than a first preset value, wherein both of the first direction and the second direction are a chromaticity-coordinate direction; and according to a magnitude relation between the actually measured chromaticity coordinate obtained after the coarse adjustment and the standard chromaticity coordinate and a magnitude relation between the differences, by adjusting the pixel component of at least one color channel of the target pixel unit, performing fine adjustment to coordinate values of the actually measured chromaticity coordinate obtained after the coarse adjustment in the first direction and the second direction at a same time, whereby both of differences in the first direction and the second direction between the actually measured chromaticity coordinate obtained after the fine adjustment and the standard chromaticity coordinate are less than a second preset value, to complete color-temperature calibration of the display screen, wherein the second preset value is less than the first preset value;

wherein before the step of measuring the chromaticity of the target pixel unit in the testing image, the method further comprises:

when a light-source electric signal of the to-be-tested display screen is preset to be a preset duty cycle, causing the to-be-tested display screen to display the testing image;

measuring a peak brightness of the display screen; and when the peak brightness is greater than a first preset brightness, by adjusting downwards a duty cycle of the light-source electric signal, performing preliminary adjustment to the peak brightness, whereby the peak brightness obtained after the preliminary adjustment is less than or equal to the first preset brightness; and after the step of, according to the magnitude relation between the actually measured chromaticity coordinate obtained after the coarse adjustment and the standard chromaticity coordinate and the magnitude relation between the differences, by adjusting the pixel component of the at least one color channel of the target pixel unit, performing the fine adjustment to the coordinate values of the actually measured chromaticity coordinate obtained after the coarse adjustment in the first direction and the second direction at the same time, the method further comprises:

measuring the peak brightness of the display screen again; and when the peak brightness that has been measured again is greater than or equal to a second preset brightness and less than or equal to a third preset brightness, completing peak-brightness calibration of the display screen, wherein the second preset brightness is less than the third preset brightness, and the third preset brightness is less than the first preset brightness.

2. The method according to claim 1, wherein after the step of measuring the peak brightness of the display screen again, the method further comprises:

when the peak brightness that has been measured again is greater than a fourth preset brightness and less than the second preset brightness, by adjusting upwards the duty cycle of the light-source electric signal, performing precise adjustment to the peak brightness, till the peak brightness obtained after the precise adjustment is greater than or equal to the second preset brightness, and less than or equal to the third preset brightness, wherein the fourth preset brightness is less than the second preset brightness; and after the step of measuring the peak brightness of the display screen again, the method further comprises:

when the peak brightness that has been measured again is greater than the third preset brightness, by adjusting downwards the duty cycle of the light-source electric signal, performing precise adjustment to the peak brightness, till the peak brightness obtained after the precise adjustment is greater than or equal to the second preset brightness, and less than or equal to the third preset brightness.

3. The method according to claim 2, wherein after the step of performing the precise adjustment to the peak brightness, till the peak brightness obtained after the precise adjustment is greater than or equal to the second preset brightness, and less than or equal to the third preset brightness, the method further comprises:

when the peak brightness obtained after the precise adjustment is greater than or equal to the second preset brightness and less than or equal to the third preset brightness, calibrating a color temperature of the display screen again, till it is satisfied that both of the differences in the first direction and the second direction between the actually measured chromaticity coordinate obtained after the fine adjustment and the standard chromaticity coordinate are less than the second preset value;

further measuring the peak brightness of the display screen; and when the peak brightness that has been further measured is greater than or equal to the second preset brightness and less than or equal to the third preset brightness, completing the color-temperature calibration and the peak-brightness calibration.

4. The method according to claim 1, wherein the target pixel unit comprises three color channels;

before the step of, according to the magnitude relation between the actually measured chromaticity coordinate and the standard chromaticity coordinate, by adjusting the pixel component of the at least one color channel of the target pixel unit, performing the coarse adjustment to the coordinate values of the actually measured chromaticity coordinate in the first direction and the second direction, and repeatedly performing the coarse adjustment till both of the differences in the first direction and the second direction between the actually measured chromaticity coordinate obtained after the coarse adjustment and the standard chromaticity coordinate are less than the first preset value, the method further comprises:

according to the magnitude relation between the actually measured chromaticity coordinate and the standard chromaticity coordinate, determining a processing mode to the target pixel unit; and determining a maintained color channel whose pixel component maintains constant in the processing mode, wherein the other two color channels than the maintained color channel among the three color channels serve as candidate color channels whose pixel values are regulatable in the processing mode; and the step of, according to the magnitude relation between the actually measured chromaticity coordinate and the standard chromaticity coordinate, by adjusting the pixel component of the at least one color channel of the target pixel unit, performing the coarse adjustment to the coordinate values of the actually measured chromaticity coordinate in the first direction and the second direction, and repeatedly performing the coarse adjustment till both of the differences in the first direction and the second direction between the actually measured chromaticity coordinate obtained after the coarse adjustment and the standard chromaticity coordinate are less than the first preset value comprises:

according to the magnitude relation between the actually measured chromaticity coordinate and the standard chromaticity coordinate, by adjusting a pixel component of at least one of the candidate color channels of the target pixel unit, performing coarse adjustment to the coordinate values of the actually measured chromaticity coordinate in the first direction and the second direction, and repeatedly performing the coarse adjustment till both of the differences in the first direction and the second direction between the actually measured chromaticity coordinate obtained after the coarse adjustment and the standard chromaticity coordinate are less than the first preset value.

5. The method according to claim 4, wherein the actually measured chromaticity coordinate comprises a first-direction actually measured coordinate and a second-direction actually measured coordinate, and the standard chromaticity coordinate comprises a first-direction standard coordinate and a second-direction standard coordinate; and the step of, according to the magnitude relation between the actually measured chromaticity coordinate obtained after the coarse adjustment and the standard chromaticity coordinate and the magnitude relation between the differences, by adjusting the pixel component of the at least one color channel of the target pixel unit, performing the fine adjustment to the coordinate values of the actually measured chromaticity coordinate obtained after the coarse adjustment in the first direction and the second direction at the same time comprises:

according to the magnitude relation between the actually measured chromaticity coordinate obtained after the coarse adjustment and the standard chromaticity coordinate, performing fine adjustment of a first stage;

circularly executing the first stage, till a preset condition is satisfied or a preset execution time quantity is reached, wherein the preset condition comprises that both of difference between the first-direction actually measured coordinate obtained after the fine adjustment and the first-direction standard coordinate and difference between the second-direction actually measured coordinate obtained after the fine adjustment and the second-direction standard coordinate are less than the second preset value; and when an execution time quantity of the first stage reaches the preset execution time quantity and still does not satisfy the preset condition, according to a magnitude relation between the actually measured chromaticity coordinate obtained after the fine adjustment at the first stage and the standard chromaticity coordinate, and a current magnitude relation between a first difference and a second difference, performing fine adjustment of a second stage, till the preset condition is satisfied, wherein the first difference is a current difference between the first-direction actually measured coordinate and the first-direction standard coordinate, and the second difference is a current difference between the second-direction actually measured coordinate and the second-direction standard coordinate.

6. The method according to claim 5, wherein the step of, according to the magnitude relation between the actually measured chromaticity coordinate obtained after the coarse adjustment and the standard chromaticity coordinate, performing the fine adjustment of the first stage comprises:

according to a magnitude relation between the first-direction actually measured coordinate obtained after the coarse adjustment and the first-direction standard coordinate, and a magnitude relation between the second-direction actually measured coordinate obtained after the coarse adjustment and the second-direction standard coordinate, determining a fifth to-be-adjusted color channel in the processing mode, and a fifth adjustment trend of a pixel component of the fifth to-be-adjusted color channel; and according to the fifth adjustment trend, adjusting the pixel component of the fifth to-be-adjusted color channel of the target pixel unit, to perform fine adjustment to the first-direction actually measured coordinate and the second-direction actually measured coordinate at a same time.

7. The method according to claim 5, wherein the step of, according to the magnitude relation between the actually measured chromaticity coordinate obtained after the coarse adjustment and the standard chromaticity coordinate, and the magnitude relation between the first difference and the second difference, performing the fine adjustment of the second stage comprises:

according to a magnitude relation between the first difference and the second difference, determining a sixth to-be-adjusted color channel in the processing mode;

according to a magnitude relation between the first-direction actually measured coordinate obtained after the coarse adjustment and the first-direction standard coordinate, and a magnitude relation between the second-direction actually measured coordinate obtained after the coarse adjustment and the second-direction standard coordinate, determining a sixth adjustment trend of a pixel component of the sixth to-be-adjusted color channel; and according to the sixth adjustment trend, adjusting the pixel component of the sixth to-be-adjusted color channel of the target pixel unit, to perform fine adjustment to the first-direction actually measured coordinate and the second-direction actually measured coordinate at a same time.

8. The method according to claim 7, wherein the step of, according to the magnitude relation between the first difference and the second difference, determining the sixth to-be-adjusted color channel in the processing mode comprises:

when the first difference is greater than or equal to the second difference, determining the sixth to-be-adjusted color channel in the processing mode to be a candidate color channel that has a largest influence on the first direction in the processing mode; and when the first difference is less than the second difference, determining the sixth to-be-adjusted color channel in the processing mode to be a candidate color channel that has a largest influence on the second direction in the processing mode.

9. The method according to claim 4, wherein the actually measured chromaticity coordinate comprises a first-direction actually measured coordinate and a second-direction actually measured coordinate, and the standard chromaticity coordinate comprises a first-direction standard coordinate and a second-direction standard coordinate; and the step of, according to the magnitude relation between the actually measured chromaticity coordinate and the standard chromaticity coordinate, by adjusting the pixel component of the at least one of the candidate color channels of the target pixel unit, performing the coarse adjustment to the coordinate values of the actually measured chromaticity coordinate in the first direction and the second direction, and repeatedly performing the coarse adjustment till both of the differences in the first direction and the second direction between the actually measured chromaticity coordinate obtained after the coarse adjustment and the standard chromaticity coordinate are less than the first preset value comprises:

from the candidate color channels, determining a first to-be-adjusted color channel with respect to the first direction in the processing mode;

according to a magnitude relation between the first-direction actually measured coordinate and the first-direction standard coordinate, determining a first adjustment trend of a pixel component of the first to-be-adjusted color channel; and according to the first adjustment trend, adjusting the pixel component of the first to-be-adjusted color channel of the target pixel unit, to perform a first time of coarse adjustment to the first-direction actually measured coordinate, and cause a difference between the first-direction actually measured coordinate obtained after the coarse adjustment for the first time and the first-direction standard coordinate to be less than a third preset value.

10. The method according to claim 9, wherein after the step of, according to the first adjustment trend, adjusting the pixel component of the first to-be-adjusted color channel of the target pixel unit, to perform the first time of the coarse adjustment to the first-direction actually measured coordinate, and cause the difference between the first-direction actually measured coordinate obtained after the coarse adjustment for the first time and the first-direction standard coordinate to be less than the third preset value, the method further comprises:

from the candidate color channels, determining a second to-be-adjusted color channel with respect to the second direction in the processing mode;

according to a magnitude relation between the second-direction actually measured coordinate and the second-direction standard coordinate, determining a second adjustment trend of a pixel component of the second to-be-adjusted color channel; and according to the second adjustment trend, adjusting the pixel component of the second to-be-adjusted color channel of the target pixel unit, to perform a second time of coarse adjustment to the second-direction actually measured coordinate, and cause a difference between the second-direction actually measured coordinate obtained after the coarse adjustment for the first time and the second-direction standard coordinate to be less than the third preset value.

11. The method according to claim 10, wherein after the step of, according to the second adjustment trend, adjusting the pixel component of the second to-be-adjusted color channel of the target pixel unit, to perform the second time of the coarse adjustment to the second-direction actually measured coordinate, and cause the difference between the second-direction actually measured coordinate obtained after the coarse adjustment for the first time and the second-direction standard coordinate to be less than the third preset value, the method further comprises:

from the candidate color channels, determining a third to-be-adjusted color channel with respect to the first direction in the processing mode;

according to the magnitude relation between the first-direction actually measured coordinate and the first-direction standard coordinate, determining a third adjustment trend of a pixel component of the third to-be-adjusted color channel; and according to the third adjustment trend, adjusting the pixel component of the third to-be-adjusted color channel of the target pixel unit, to perform a second time of coarse adjustment to the first-direction actually measured coordinate, and cause a difference between the first-direction actually measured coordinate obtained after the coarse adjustment for the second time and the first-direction standard coordinate to be less than the first preset value.

12. The method according to claim 11, wherein after the step of, according to the third adjustment trend, adjusting the pixel component of the third to-be-adjusted color channel of the target pixel unit, to perform the second time of the coarse adjustment to the first-direction actually measured coordinate, and cause the difference between the first-direction actually measured coordinate obtained after the coarse adjustment for the second time and the first-direction standard coordinate to be less than the first preset value, the method further comprises:

from the candidate color channels, determining a fourth to-be-adjusted color channel with respect to the second direction in the processing mode;

according to the magnitude relation between the second-direction actually measured coordinate and the second-direction standard coordinate, determining a fourth adjustment trend of a pixel component of the fourth to-be-adjusted color channel; and according to the fourth adjustment trend, adjusting the pixel component of the fourth to-be-adjusted color channel of the target pixel unit, to perform the second time of coarse adjustment to the second-direction actually measured coordinate, and cause a difference between the second-direction actually measured coordinate obtained after the coarse adjustment for the second time and the second-direction standard coordinate to be less than the first preset value.

13. The method according to claim 4, wherein a maximum pixel value that is reachable by the maintaining of the display screen by the pixel component of the maintained color channel before and after the color-temperature calibration is constant.

14. An image-quality calibrating system, wherein the image-quality calibrating system comprises: a displaying terminal and a colorimeter;

the displaying terminal comprises a display screen, a memory and one or more processors;

the display screen is configured for displaying the testing image;

the colorimeter is configured for measuring the chromaticity of the target pixel unit in the testing image, to obtain the actually measured chromaticity coordinate of the target pixel unit, and transmitting the obtained actually measured chromaticity coordinate to the one or more processors; and the memory stores one or more programs, and the programs, when executed by the one or more processors, implement the steps of the color-temperature calibration in the image-quality calibrating method according to claim 1.

15. The image-quality calibrating system according to claim 14, wherein the displaying terminal further comprises a system on chip;

the memory is integrated in the system on chip;

the one or more processors comprise: a field-programmable logic gate array, and at least one processor integrated in the system on chip;

the at least one processor is coupled to the colorimeter and the field-programmable logic gate array, and the at least one processor is configured for receiving the actually measured chromaticity coordinate of the target pixel unit transmitted by the colorimeter, according to the actually measured chromaticity coordinate, determining an adjustment amount of a pixel component of at least one color channel of the target pixel unit, and transmitting the pixel component obtained after the adjustment of the target pixel unit to the field-programmable logic gate array; and the field-programmable logic gate array is coupled to the display screen, and is configured for, according to the pixel component obtained after the adjustment of the target pixel unit, driving the display screen to display.

16. The image-quality calibrating system according to claim 15, wherein the system further comprises a brightness meter;

the display screen is further configured for, when a light-source electric signal is preset to be a preset duty cycle, displaying the testing image;

the brightness meter is configured for measuring a peak brightness of the display screen, and transmitting the measured peak brightness to the at least one processor; and the at least one processor is coupled to the brightness meter, and the programs, when executed by the one or more processors, implement the steps of the color-temperature calibration in the image-quality calibrating method.

17. The image-quality calibrating system according to claim 16, wherein the at least one processor is further configured for, before the color-temperature calibration, receiving the peak brightness transmitted by the brightness meter, according to the peak brightness, determining a duty-cycle preliminary adjustment amount of the light-source electric signal, and transmitting the duty-cycle preliminary adjustment amount to the field-programmable logic gate array; and the field-programmable logic gate array is further configured for, according to the duty-cycle preliminary adjustment amount, performing preliminary adjustment to the duty cycle of the light-source electric signal of the display screen, and according to the duty cycle of the light-source electric signal obtained after the preliminary adjustment, driving the display screen to display.

18. The image-quality calibrating system according to claim 17, wherein the at least one processor is further configured for, after the color-temperature calibration, receiving the peak brightness measured again that is transmitted by the brightness meter, according to the peak brightness measured again, determining a duty-cycle fine adjustment amount of the light-source electric signal, and transmitting the duty-cycle fine adjustment amount to the field-programmable logic gate array; and the field-programmable logic gate array is further configured for, according to the duty-cycle fine adjustment amount, performing precise adjustment to the duty cycle of the light-source electric signal of the display screen, and according to the duty cycle of the light-source electric signal obtained after the precise adjustment, driving the display screen to display.

19. A non-transitory computer-readable storage medium, wherein the storage medium stores a computer program instruction, and the computer program instruction, when executed in the image-quality calibrating system according to claim 14, causes the image-quality calibrating system to implement steps of the image-quality calibrating method.

* * * * *